United States Patent
Nakata et al.

(10) Patent No.: US 7,094,147 B2
(45) Date of Patent: Aug. 22, 2006

(54) GAME SYSTEM, PUZZLE GAME PROGRAM, AND STORAGE MEDIUM HAVING PROGRAM STORED THEREIN

(75) Inventors: Masayasu Nakata, Kyoto (JP); Yutaka Yamashita, Taito-ku (JP); Hiroshi Okamoto, Taito-ku (JP)

(73) Assignee: Nintendo Co., Ltd., Kyoto (JP)

( * ) Notice: Subject to any disclaimer, the term of this patent is extended or adjusted under 35 U.S.C. 154(b) by 615 days.

(21) Appl. No.: 10/224,408

(22) Filed: Aug. 21, 2002

(65) Prior Publication Data

US 2003/0040350 A1   Feb. 27, 2003

(30) Foreign Application Priority Data

Aug. 22, 2001   (JP) ............................. 2001-250932

(51) Int. Cl.
G06F 17/00 (2006.01)
G06F 19/00 (2006.01)

(52) U.S. Cl. .................. 463/9; 463/31; 463/37; 463/38

(58) Field of Classification Search ............... 463/9
See application file for complete search history.

(56) References Cited

U.S. PATENT DOCUMENTS

| | | | |
|---|---|---|---|
| 4,925,189 A | | 5/1990 | Braeunig |
| 5,128,671 A | * | 7/1992 | Thomas, Jr. ................ 341/20 |
| 5,265,888 A | | 11/1993 | Yamamoto et al. |
| 5,312,113 A | | 5/1994 | Ta-Hsien et al. |
| 5,643,085 A | | 7/1997 | Aityan et al. |
| 5,921,548 A | | 7/1999 | Goldberg |
| 6,062,978 A | | 5/2000 | Martino et al. |
| 6,093,104 A | | 7/2000 | Kasahara et al. |
| 6,200,219 B1 | * | 3/2001 | Rudell et al. ................ 463/37 |
| 6,237,914 B1 | | 5/2001 | Saltanov et al. |
| 6,256,040 B1 | | 7/2001 | Tanaka et al. |
| 6,322,450 B1 | | 11/2001 | Nakano |
| 6,375,572 B1 | * | 4/2002 | Masuyama et al. ........... 463/43 |
| 6,458,032 B1 | | 10/2002 | Yamagami |

FOREIGN PATENT DOCUMENTS

| | | |
|---|---|---|
| EP | 1062994 | 12/2000 |
| JP | 3-71154 | 11/1991 |
| JP | 4-54986 | 2/1992 |
| WO | WO 00/27493 | 5/2000 |

OTHER PUBLICATIONS

Tetris Attack for SUPER NINTENDO: Instruction Manual. Tetris Attack, Released on Jun. 6, 1996. Scanned Copy. [Online] [retrieved on Sep. 15, 2005] Retrieved from The Game Manul Archive <URL:http://www.gamemanuals.net/>. Attaching PDF Print Out (6 pages).*

Barbie Kitten's Puzzle Fighter Page. [online]. Dated: Apr. 4, 1999. [retrieved Sep. 20, 2005] Retrieved from Internet : <URL:http://www.fortunecity.com/lavendar/stroheim/88/pzft.html>.*

(Continued)

*Primary Examiner*—Corbett B. Coburn
*Assistant Examiner*—Milap Shah
(74) *Attorney, Agent, or Firm*—Nixon & Vanderhye P.C.

(57) ABSTRACT

There is provided a game system and a puzzle game program capable of changing displayed states of puzzle elements depending on a tilt of the puzzle game apparatus, such that a high level of strategy-making is required and drastic game developments and excitement are realized, as well as a storage medium having the puzzle game program stored therein. A tilt detection section is provided in connection with the game apparatus (or a controller therefor) for determining a tilt direction. The puzzle elements displayed on a display screen are moved in a tilt direction of the game apparatus.

38 Claims, 16 Drawing Sheets

OTHER PUBLICATIONS

Reversi. [online] Board & Computer Game. See Wikipedia Page. <URL:http://en.wikipedia.org/wiki/Reversi>.*

David Weaver, The Gaming Intelligence Agency, 1996, Tetris Attack, internet search.

Welltris, 1989 3D Tetris, Internet search.

XP-002292754, "Microsoft SideWinder FreeStyle Pro", 2 pages, Sep. 24, 1998, Microsoft Hardware, http://web.archive.org/web/19990302093752/www.microsoft.com/products/hardware/sidewiner/tilt/default.htm.

XP-002292755, "Microsoft Sidewinder Freestyle Pro Review", Aug. 30, 1999, 3 pages. http://web/archive.org/web/19990830073339/http://activewin.com/reviews/hardware/joysticks/ms_ freestyle_pro.shtml.

Analog Devices, Inc., "New Game Controllers Using Analog Devices' G-Force Tilt to be Featured at E3," 2 pages, Analog Devices, Low Cost ±2g/±10 g Dual Axis iMEMs, ®Accelerometers with Digital Output, 11 pages, May 10, 1999.

* cited by examiner

| PROGRAM STORAGE AREA | 41 |
|---|---|
| MAIN PROGRAM | 41a |
| TILT DETECTION PROGRAM | 41b |
| TOP/BOTTOM DETERMINATION PROGRAM | 41c |
| BLOCK MOVEMENT PROGRAM | 41d |
| BLOCK ARRANGEMENT PROCESSING PROGRAM | 41e |
| BLOCK ADDITION PROGRAM | 41f |
| GAME CLEARANCE DETERMINATION PROGRAM | 41g |

| DATA STORAGE AREA | 42 |
|---|---|
| BLOCK DATA | 42a |
| GAME MAP DATA | 42b |
| BLOCK IMAGE DATA | 42c |
| GAME IMAGE DATA | 42d |
| GAME SOUND DATA | 42e |

EXAMPLE OF COMBINATION PROCESS

55a

EXAMPLE OF ATTRIBUTE CHANGE

55b

EXAMPLE OF BLOCK DISSOLUTION  DISSOLVE WITH B BUTTON

55c

EXAMPLE OF BLOCK EXPLOSION  EXPLODE WITH C BUTTON

55d

GAME SYSTEM, PUZZLE GAME PROGRAM, AND STORAGE MEDIUM HAVING PROGRAM STORED THEREIN

BACKGROUND

1. Field of Non-Limiting Exemplary Embodiments

Present non-limiting exemplary embodiments relate to a puzzle game apparatus, a puzzle game program, and a storage medium having the puzzle game program stored therein. More particularly, the present non-limiting exemplary embodiments relate to a puzzle game apparatus and a puzzle game program which allow a puzzle game to be played on, for example, a home-use TV game machine, an arcade video game machine, or a hand-held game machine, and a storage medium having a puzzle game program stored therein.

2. Description of Background Art

Conventionally, the following puzzle games are known, among others: a puzzle game disclosed in Japanese Patent Examined Publication No. 3-71154 (hereinafter referred to as "Technique 1"); a product designated "Tetris" marketed by Nintendo Co., Ltd. (hereinafter referred to as "Technique 2"); a puzzle game disclosed in Japanese Patent Laid-Open Publication No. 4-54986 (a product designated "Dr. Mario" marketed by Nintendo Co., Ltd.; hereinafter referred to as "Technique 3"); and a product designated "Panel De Pon" (also known overseas as "Tetris Attack" or "Pockemon Puzzle League") marketed by Nintendo Co., Ltd.; hereinafter referred to as "Technique 4").

Techniques 1 to 3 may be classified as puzzle games concerning dropping objects (dropping-object games), where objects such as blocks or capsules appear to fall down from the top of the game screen, and are operated by a player while they are falling so as to land in particular positions which cannot be changed once the objects have landed and piled up. The idea behind the dropping-object games of Techniques 1 to 3 is, by resourcefully changing where to pile up the objects, the player can make sure that objects form a contiguous horizontal row, or any line or chain of a predetermined number of objects; as a result, such objects disappear and any other objects which were present above the disappeared objects shift downwards. The number of erased lines or objects may be counted into the score. If the objects pile up to a certain height as a result of mis-operation or mis-planning on the player's part, the game is over.

On the other hand, Technique 4 embodies a game where panels of different attributes such as colors or textures rise from the bottom, whose positions can be switched along a vertical or horizontal direction by the operations of a player, such that once a certain number (or more) of panels of the same attribute are present along a vertical or horizontal direction, such panels disappear, until the panels reach a threshold height, at which time the game is over.

In any one of Techniques 1 to 4, the only input device which is controllable by the player to execute game operations, including switching or addition of blocks, is the button(s) provided on the game apparatus. Moreover, in the case where new blocks are added (whether falling or rising) into the game screen, such additional blocks will only come from a fixed direction. Therefore, simply by repeatedly playing the puzzle game, a player may eventually become able to formulate some sort of strategy for erasing blocks, and advance the game so as to be able to erase as many blocks as possible with each single operation.

As mentioned above, in the case of conventional puzzle games, the only input means for conveying the intentions of a player is the operation switch(es) provided on a controller for the game machine. Therefore, there is a problem in that the game operation may become monotonous, thus detracting from the fun of game playing and reducing the sense of involvement. Moreover, any change in the displayed images (hereinafter referred to as "image transformation") occurs based on the user's operation on the puzzle elements using the controller. Since any changes will occur in predictable and non-accidental manners, the game play may become monotonous and boring.

While conventional puzzle games may be able to allow a player to partially switch the positions of one or several selected blocks before new puzzle elements such as blocks are added on the displayed image, it is not possible to cause a drastic change in the arrangement of a large number of puzzle elements which are already present, or displayed in a fixed manner, on the displayed image.

Since the puzzle elements will only move in one fixed direction with respect to the display screen, and any additional puzzle elements will come from a fixed direction, it becomes easy to formulate strategies for game clearance after playing the game for a while, rather than constantly requiring adaptations to accidental changes. In this respect, conventional puzzle games are likely to become boring.

SUMMARY OF PRESENT NON-LIMITING EXEMPLARY EMBODIMENTS

Therefore, an aspect of present non-limiting exemplary embodiments is to provide a puzzle game apparatus and a puzzle game program such that the displayed states of puzzle elements can change depending on the tilt of the game apparatus or a game controller, as well as a storage medium having such a puzzle game program stored therein.

Another aspect of present non-limiting exemplary embodiments is to provide a puzzle game apparatus and a puzzle game program such that the puzzle elements in a puzzle game can be switched drastically (or in large numbers at a time), thereby providing for more image transformation, intrigue, and excitement, as well as a storage medium having such a puzzle game program stored therein.

Still another aspect of present non-limiting exemplary embodiments is to provide a puzzle game apparatus and a puzzle game program such that the displayed states of puzzle elements are likely to change in accidental manners so as to prevent monotonousness and to keep a player interested, as well as a storage medium having such a puzzle game program stored therein.

A first aspect of present non-limiting exemplary embodiments is directed to a game system (FIG. 1) for allowing a puzzle game to be played thereon, the game system comprising: a display screen (e.g., LCD 12 of the embodiment described later below, FIG. 1) for displaying a plurality of puzzle elements (e.g., blocks 51 in FIG. 4) of the puzzle game, the plurality of puzzle elements being operable on within the display screen; a tilt detection section (31, 33 in FIG. 2); a puzzle element displaying control section (S33 in FIG. 11); and an image transformation section (S34 in FIG. 11). The tilt detection section detects a tilt of a game apparatus (i.e., the game machine itself in the case of a hand-held game machine, or a game controller in the case of a non-hand-held game machine). The puzzle element displaying control section at least controls at least one of the plurality of puzzle elements displayed on the display screen to be moved in response to an output from the tilt detection section. The image transformation section causes an image transformation when a plurality of puzzle elements take a predetermined arrangement as a result of the control by the puzzle element displaying control section.

In one embodiment, the puzzle element, displaying control section comprises an initial image generation section and a puzzle element addition section. The initial image generation section generates an initial image to be displayed before the at least one puzzle element is moved. The puzzle element addition section causes puzzle elements to be additionally displayed on the display screen in response to an output from the tilt detection section.

In another embodiment, the game system further comprises a game controller or a game pad. The puzzle element addition section causes the puzzle elements to be additionally displayed on the display screen upon detection of an output from the game controller or game pad.

In still another embodiment, the game system further comprises a timer. The puzzle element addition section causes the puzzle elements to be additionally displayed on the display screen in response to an output from the timer having measured a predetermined period of time.

In still another embodiment, the puzzle element displaying control section comprises an attribute data setting section for assigning an attribute to each of the plurality of puzzle elements.

In still another embodiment, the image transformation section causes the image transformation with respect to an arrangement of puzzle elements having a same attribute assigned by the attribute data setting section.

In still another embodiment, the image transformation section causes the image transformation when a predetermined number or more of contiguous puzzle elements having the same attribute assigned by the attribute data setting section are aligned in at least one direction.

In still another embodiment, the image transformation section causes the image transformation when at least two puzzle elements having the same attribute assigned by the attribute data setting section take an arrangement interposing a predetermined number of puzzle elements.

In still another embodiment, the image transformation section causes the image transformation when a plurality of puzzle elements having the same attribute assigned by the attribute data setting section take a predetermined arrangement, the image transformation involving erasing all of the plurality of puzzle elements taking the predetermined arrangement.

In still another embodiment, the image transformation section causes the image transformation when a plurality of puzzle elements having the same attribute assigned by the attribute data setting section take a predetermined arrangement, the image transformation comprising combining all of the plurality of puzzle elements taking the predetermined arrangement.

In still another embodiment, when a plurality of puzzle elements having the same attribute assigned by the attribute data setting section take a predetermined arrangement, the image transformation section changes the attribute of the plurality of puzzle elements taking the predetermined arrangement.

In still another embodiment, the game system further comprises a controller or a game pad. After at least one puzzle element having assigned thereto an attribute which is associated with a predetermined operational output from the controller or game pad takes a predetermined arrangement with at least another puzzle element, the image transformation section causes the image transformation upon detecting the predetermined operational output.

In still another embodiment, the game system further comprises a controller or a game pad. After at least one puzzle element having assigned thereto an attribute which is associated with a predetermined operational output from the controller or game pad is arranged so as to adjoin at least another puzzle element, the image transformation section causes the image transformation upon detecting the predetermined operational output, the image transformation involving erasing the at least one puzzle element and the at least other puzzle element.

In still another embodiment, the game system further comprises a controller or a game pad. The attribute data setting section assigns an attribute concerning a moving direction to each of the plurality of puzzle elements, and the puzzle element displaying control section controls each of the plurality of puzzle elements displayed on the display screen to be moved in accordance with the attribute concerning the moving direction.

A second aspect of present non-limiting exemplary embodiments is directed to a storage medium storing a puzzle game program for causing a game system to function as a puzzle game, the game system at least comprising an image display section (12 in FIGS. 1 and 12) for displaying a plurality of puzzle elements (e.g., blocks 51 in FIG. 4) of the puzzle game, a tilt detection section (31 and 33 in FIG. 2) for detecting a tilt of the game system, and a puzzle element storage section (25 in FIG. 2), the plurality of puzzle elements being operable on within a display screen of the image display section, the program comprising a tilt direction determination step (S31 in FIG. 11), a puzzle element movement displaying step (S33 in FIG. 11), and an image transformation step (S34 in FIG. 11). The tilt direction determination step determines a tilt direction in accordance with an output from the tilt detection section. The a puzzle element movement displaying step controls at least one of the plurality of puzzle elements displayed on the display screen to be moved in accordance with the tilt direction determination step. The image transformation step causes an image transformation when a plurality of puzzle elements displayed on the display screen take a predetermined arrangement after performing the puzzle element movement displaying step.

In one embodiment, the storage medium may be constructed so as to be detachable from the game apparatus 10 as shown in FIG. 1, and the tilt detection section is integrally formed in the storage medium. Thus, by exchanging the storage medium, it becomes possible to play different games.

According to the second aspect, the puzzle game can also be played in a game system where the program is provided in the form of a removable storage medium.

By internalizing the tilt detection section (31 and 33 in FIG. 2) in the storage medium, it becomes possible to practice the present invention by employing a game apparatus which does not include an internal tilt detection section.

A third aspect of present non-limiting exemplary embodiments is directed to a game system for allowing a puzzle game to be played thereon, the game system comprising: a display section (12 in FIG. 1) for displaying a plurality of puzzle elements (e.g., blocks 51 in FIG. 4) of the puzzle game, the plurality of puzzle elements being operable on within a display screen of the display section; an acceleration detection section (31 in FIG. 2), a puzzle element displaying control section (S33 in FIG. 11), and an image transformation section (S34 in FIG. 11). The acceleration detection section detects an acceleration. The puzzle element displaying control section controls at least one of the plurality of puzzle elements displayed on the display screen to be moved in response to an output from the acceleration detection section. The image transformation section causes an image transformation when a plurality of puzzle elements take a predetermined arrangement as a result of the control by the puzzle element displaying control section.

In one embodiment, the puzzle element displaying control section comprises an initial image generation section, a puzzle element movement direction determination section, and a puzzle element movement displaying section. The initial image generation section generates an initial image to be displayed before the at least one puzzle element is moved. The puzzle element movement direction determination section determines a direction in which to move the at least one puzzle element in response to an output from the acceleration detection section. The puzzle element movement displaying section causes the at least one puzzle element displayed on the display screen to be moved in accordance with an output from the puzzle element movement direction determination section. Thus, the output from the acceleration detection section 31 is utilized for detecting a tilt of the game system (FIG. 12). The puzzle game causes a majority of the puzzle elements displayed on the display screen to be moved based on the result of tilt detection.

A fourth aspect of present non-limiting exemplary embodiments is directed to a storage medium storing a puzzle game program for use in a game system at least comprising: a tilt detection section (31 and 33 in FIG. 2) for detecting a tilt; a puzzle element data storage section (26 in FIG. 2) for storing at least attribute data concerning puzzle elements (51 to 53 in FIG. 4) to be displayed on the display screen; a display section (12 in FIG. 1 or 2) for displaying the puzzle elements on a display screen; and a processing section (21 in FIG. 2) for processing the puzzle game program and changing displayed state of at least one puzzle element displayed on the display screen in accordance with a tilt direction detected by the tilt detection section (S31 in FIG. 11) and puzzle element data (85 to 88 in FIG. 9) stored in the puzzle element data storage section. The puzzle game program causes the game system to function as a puzzle game such that, with respect to a plurality of puzzle elements (FIG. 3) displayed on the display screen each having at least one predetermined shape and one of at least two attributes, when a plurality of puzzle elements having a same attribute take an arrangement (55L in FIG. 5) having a predetermined regularity, the plurality of puzzle elements taking the predetermined arrangement are converted to puzzle elements of another attribute and displayed (55L-1 in FIG. 5). The program comprises a tilt direction determination step (S31 in FIG. 11), a puzzle element movement displaying step (S33 in FIG. 11), a displayed state determination step (S34 in FIG. 11), and a displayed state changing step (FIG. 16). Puzzle elements are displayed at some coordinate positions in the display screen and vacancies are displayed at other coordinate positions, the puzzle elements being piled up from a lower position to a higher position in accordance with the tilt direction detected by the tilt detection section (55 in FIG. 5). The tilt direction determination step determines a tilt direction based on an output from the tilt detection section when a whole or a part of the game system is tilted. The puzzle element movement displaying step controls the puzzle elements displayed on the display screen to be moved in the tilt direction while allowing the puzzle elements to be piled up on an end of the display screen in the tilt direction to build in an opposite direction of the tilt direction. The displayed state determination step determines whether displayed states of the puzzle elements displayed on the display screen have taken an arrangement having a predetermined regularity or not. The displayed state changing step, in accordance with a result of determination by the displayed state determination step, converts a plurality of puzzle elements of the same attribute having taken the predetermined arrangement into puzzle elements having another attribute.

Thus, there is provided a puzzle game apparatus and a storage medium storing a puzzlegame program therein such that the displayed states of puzzle elements can change depending on thed tilt of the game apparatus or a game controller.

Moreover, the puzzle elements in a puzzle game can be switched drastically (or in large numbers at a time), thereby providing for more image transformation, intrigue, and excitement.

Furthermore, the displayed states of puzzle elements are likely to change in accidental manners so as to prevent monotonousness and to keep a player interested.

According to an embodiment of the present invention, it is possible introduce a change, e.g., erasure, in the puzzle elements which are already in a displayed image, even before additional puzzle elements are added. The displayed states of the puzzle elements can be switched drastically (or in large numbers at a time), furthermore, the degree of change in the arrangement can be varied depending on the order of the tilt of the game apparatus or a game controller, thereby providing a puzzle game which requires an unprecedented kind of strategy making.

Since the direction from which additional puzzle elements are introduced varies depending on the tilt direction, the puzzle game according to the present invention requires a high leave of strategy-making on the part of the player, and also providing exciting surprises in the game development, thereby preventing the player from becoming bored.

Furthermore, by intrducing a tilt operation in the operation of the game apparatus, the player will be intregued by the relationship between the tilt operation and the movements of the puzzle elements on the displayed image and consequential image transformation (e.g., erasure) concerning the displayed status of the puzzle elements. By internalizing a tilt detection section (display section), it becomes possible to provide an exciting sensation due to the image transformations being linked to the game operation. By providing such an interface which combines an instinctive operation and image displaying, there is realized a puzzle game which even beginners including infants and elderly people can familiarize themselves with.

These and other objects, features, aspects and advantages of the present non-limiting exemplary embodiments will become more apparent from the following detailed description of the present invention when taken in conjunction with the accompanying drawings.

BRIEF DESCRIPTION OF THE DRAWINGS

FIG. 3 is a memory map used for a game apparatus according to the present non-limiting exemplary embodiment;

DETAILED DESCRIPTION OF THE NON-LIMITING EXEMPLARY EMBODIMENTS

Figure 1:
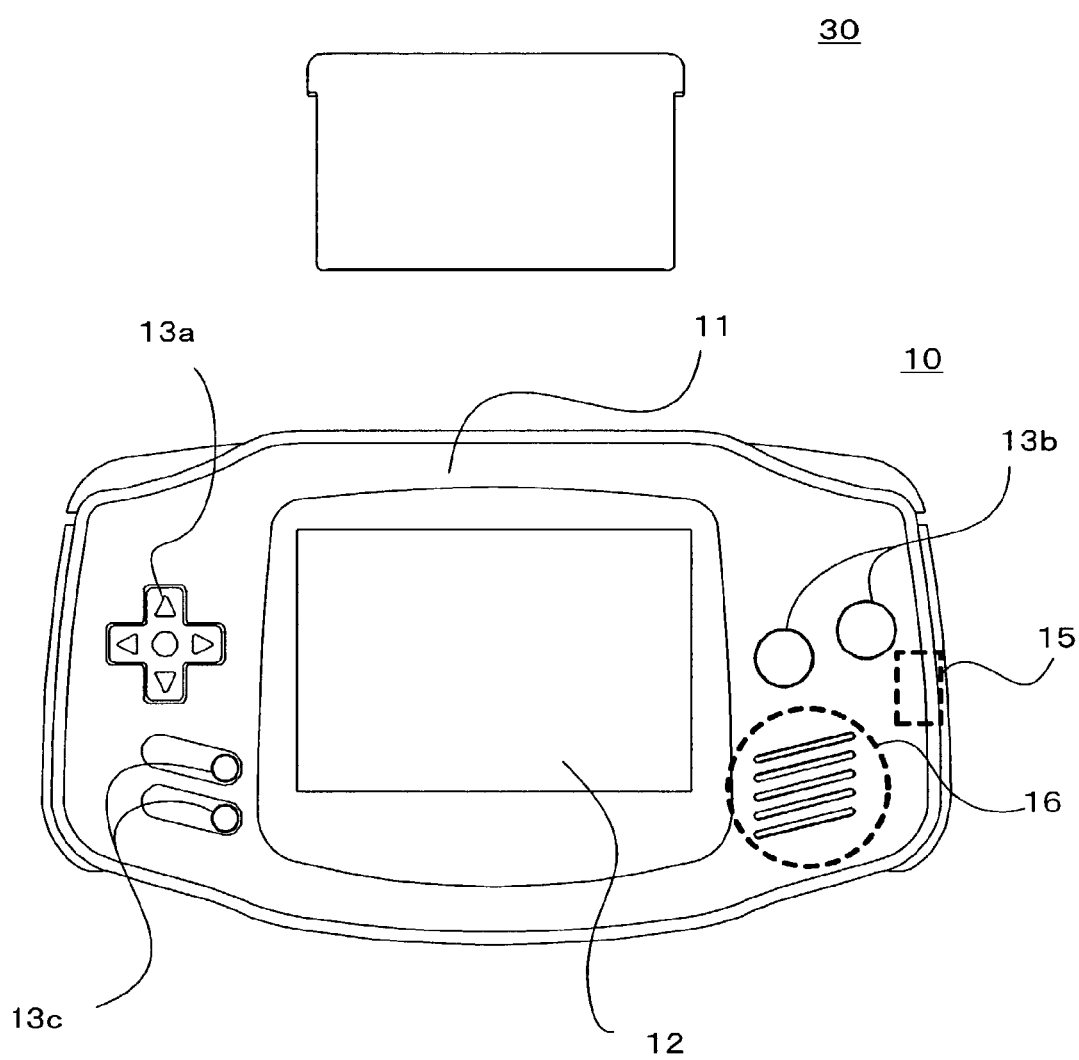
FIG. 1 is a plan view illustrating a game system according to a present non-limiting exemplary embodiment.

FIG. 1 is a plan view illustrating a game system according to the present non-limiting exemplary embodiment. The game system comprises a game apparatus 10 and an external storage medium 30, such as a memory cartridge. The game apparatus 10 is a portable game machine of a size adequate for being held in both hands of a player. By exchanging the detachable external storage medium 30, it is possible to play different games on the game apparatus 10. The game apparatus 10 includes an oblong housing 11. A liquid crystal display (LCD) device 12 is formed in an approximate center of one of the principal faces (i.e., the surface shown in FIG. 1) of the housing 11. On the right and left sides of the LCD 12, operation members in the form of operation switches 13 are provided. The operation switches 13 may include, for example, a direction switch 13a, an action switch 13b, and a start/select buttons 13c. The direction switch 13a is used to instruct a direction in which to move a game character (e.g., a block or puzzle element). The action switch 13b is used to instruct a particular action which the player wants a game character to undergo. The start/select buttons 13c is used to begin game playing or to interrupt game operation. The game content as processed by the game apparatus 10 is projected by the LCD 12. As the player operates on the various operation switches 13, the displayed image will change accordingly.

As necessary, the game apparatus 10 may have a connector 15 on one side of the game apparatus 10, and a loudspeaker 16 underneath a sound hole, the connector 15 being used for connection with another game apparatus 10 to play an on-line game other users.

Figure 2:
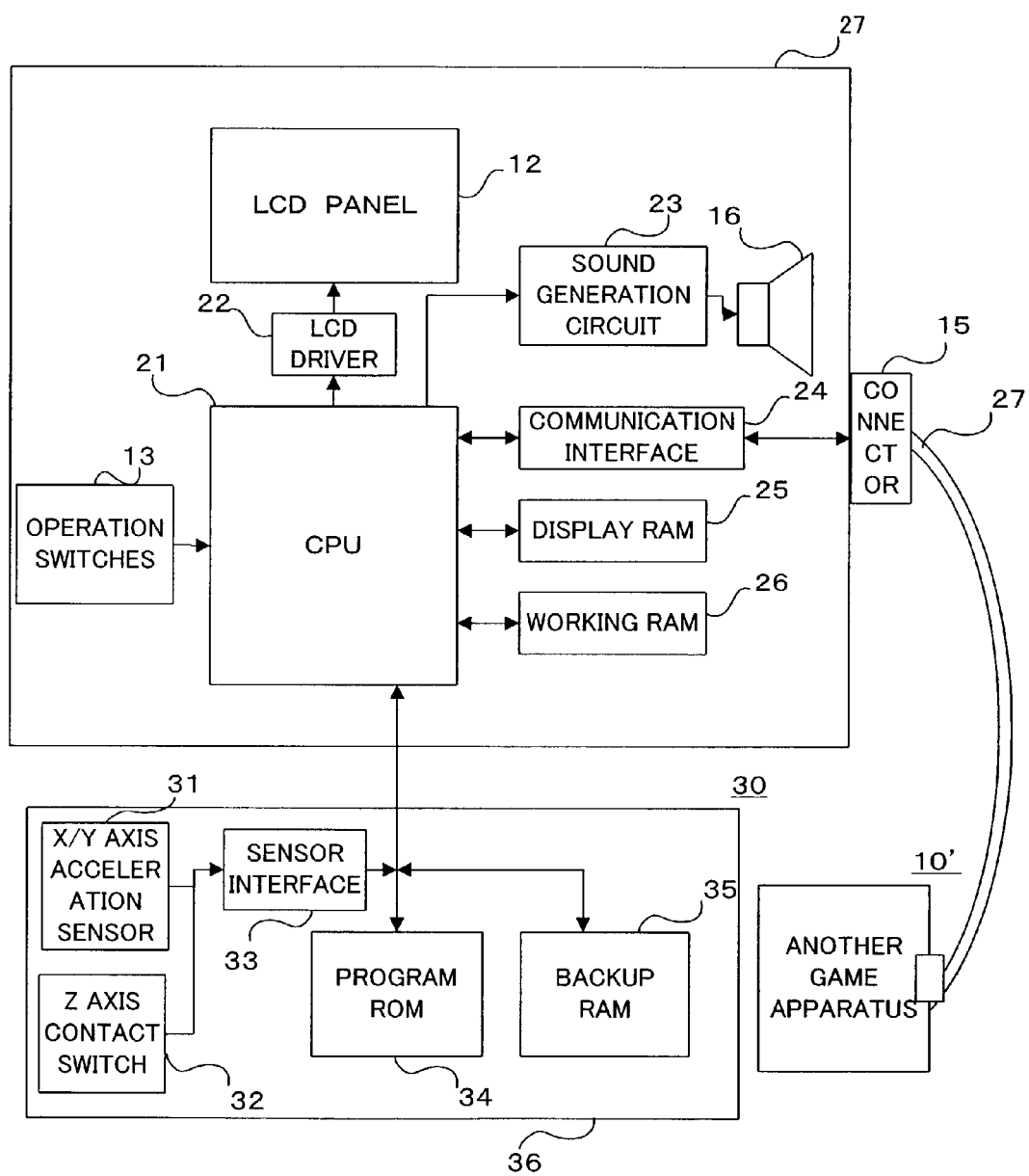
FIG. 2 is a block diagram illustrating the details of the game system shown in FIG. 1.

FIG. 2 is a block diagram illustrating the game machine 10 and the external storage medium 30 storing the puzzle game program according to the present non-limiting exemplary embodiments. The game machine 10 includes a CPU 21. The CPU 21 performs game processing in accordance with a program stored in the program ROM 34, which in turn is within the external storage medium 30. Connected to the CPU 21 are an LCD driver 22, a sound generation circuit 23, a communication interface 24, a display RAM 25 and a working RAM (hereinafter abbreviated as a "WRAM") 26. The sound generation circuit 23 converts sound data which is generated in connection with the game processing of the game by the CPU 21 into an analog signal, so as to output game music or sound effects through the loudspeaker 16. Image data to be displayed on the LCD 12 is written to the display RAM 25 so as to be temporarily stored therein, and then displayed via the LCD driver 22. Data which is used by the CPU 21 for game processing is loaded onto the WRAM 26, which stores any data generated during the game processing in an updating fashion.

The communication interface 24 is used for the game apparatus 10 to communicate (or exchange data) with another game apparatus 10' for playing an on-line game. In that case, the communication interface 24 is connected to the other game machine 10' via the connector 15 and a cable 27.

The external storage medium 30 includes an X/Y axes acceleration sensor 31, a Z axis contact switch 32, a sensor interface 33, the program ROM 34, and a backup RAM 35. When the game apparatus 10 is tilted or a sudden impact is applied thereto, the X/Y axes acceleration sensor 31 detects acceleration in an X axis direction as well as acceleration in a Y axis direction. The Z axis contact switch 32 senses the vibration of the game machine 10 as it is shaken along a perpendicular direction. The sensor interface 33 sends the results of detection by the X/Y axes acceleration sensor 31 or the Z axis contact switch 32 to the CPU 21 of the game machine 10. The program ROM 34 stores the puzzle game program according to the present invention in a non-volatile manner. The backup RAM 35, which may be implemented as a flash memory, is a memory which enables writing or reading of data concerning a game currently under playing.

The program ROM 34, the X/Y axes acceleration sensor 31, and the Z axis contact switch 32 may be internalized in the game apparatus 10. By thus attaching the X/Y axes acceleration sensor 31 on the game apparatus 10 having the LCD 12 integrally formed thereon, it becomes possible to detect a tilt in terms of the tilt direction of the display screen 12, thereby enabling intuitive game playing.

Although the game apparatus 10 is illustrated as having the LCD 12 integrally formed thereon, the present invention is also applicable to a non-hand-held type video game machine which is connected to a home-use television set (CRT), for example. In that case, the operation switch 13, the X/Y axes acceleration sensor 31, and the Z axis contact switch 32 may be provided on a separate controller or game pad for the game machine, instead of being formed on the housing 11 in an integral manner.

FIG. 3 shows a memory map 40 used by the game apparatus 10. The memory map 40 exemplifies a memory map during the operation of the game program, with reference to both the WRAM 26 in the game apparatus 10 and the program ROM 34 in the external storage medium 30.

The memory map 40 includes a program storage area 41 and a data storage area 42. The program storage area 41 includes a main program storage area 41*a*, a tilt detection program storage area 41*b*, a top/bottom determination program storage area 41*c*, a block movement program storage area 41*d*, a block arrangement processing program storage area 41*e*, a block addition program storage area 41*f*, and a game clearance determination program storage area 41*g*.

The main program storage area 41*a* is an area for storing a main program which has a central function in the game program, e.g., activating a game program in the game apparatus 10, processing operational inputs from a player, and performing image processing. The tilt detection program storage area 41*b* is an area for storing a program which detects a direction (hereinafter referred to as a "tilt direction") in which the game apparatus 10 is being tilted by the player based on an output from the X/Y axes acceleration sensor 31. The top/bottom determination program area 41*c* is an area for storing a program which determines and sets a "top" and a "bottom" of the puzzle game (which in the present example correspond to, respectively, a point where puzzle elements start falling and a point where puzzle elements land in the displayed image), based on the tilt direction of the game apparatus 10.

The block movement program area 41*d* is an area for storing a program responsible for the processing concerning falling movements of puzzle elements in the puzzle game as displayed on the LCD 12 in the present example. The block arrangement processing program storage area 41*e* is an area for storing a program which examines the attributes of each of a plurality of puzzle elements displayed in the puzzle game, and upon detecting a predetermined regularity in the arrangement of the puzzle elements, causes an image transformation by erasing the puzzle elements or combining puzzle elements, for example. The block addition program area 41*f* is an area for storing a program which introduces additional puzzle elements within the displayed image on the LCD 12 in order to enhance excitement of the puzzle game. For example, the player may press the operation switch 13*b* to cause some blocks to be added from the top of the display screen 12. The game clearance determination program storage area 41*g* is an area for storing a program which examines a clearance condition for the puzzle game, e.g., whether or not a predetermined number of puzzle elements have been erased, to determine a game clearance if the predetermined number of puzzle elements have been erased.

The data storage area 42 includes a block data storage area 42*a*, a game map data storage area 42*b*, a block image data storage area 42*c*, a game image data storage area 42*d*, and a game sound data storage area 42*e*.

The block data storage area 42*a* is an area for storing the individual blocks such as puzzle elements and background blocks, including regions to be displayed on the LCD 12, to be used in the map of the puzzle game. More specifically, the block data storage area 42*a* includes an area in which image data for blocks is designated and an area for storing attribute data.

The game map data storage area 42*b* is an area for storing game map data, i.e., data concerning a map on which the puzzle game takes place. More specifically, the game map data storage area 42*b* stores data concerning where on the map the puzzle elements exist, and where on the map no puzzle elements exist but only a background is being displayed. The block image data storage area 42*c* is an area for storing actual color data concerning the puzzle elements and background blocks. More specifically, it is the data stored in the area 42*c* that is transferred to the display RAM 25 so as to be displayed on the LCD 12.

The game image data storage area 42*d* is an area for storing data for displaying various images used in the main program, other than the block data concerning the puzzle elements and background blocks. The game sound data storage area 42*e* is an area for storing sound data used for various programs stored in the program storage area 41.

Figure 4:
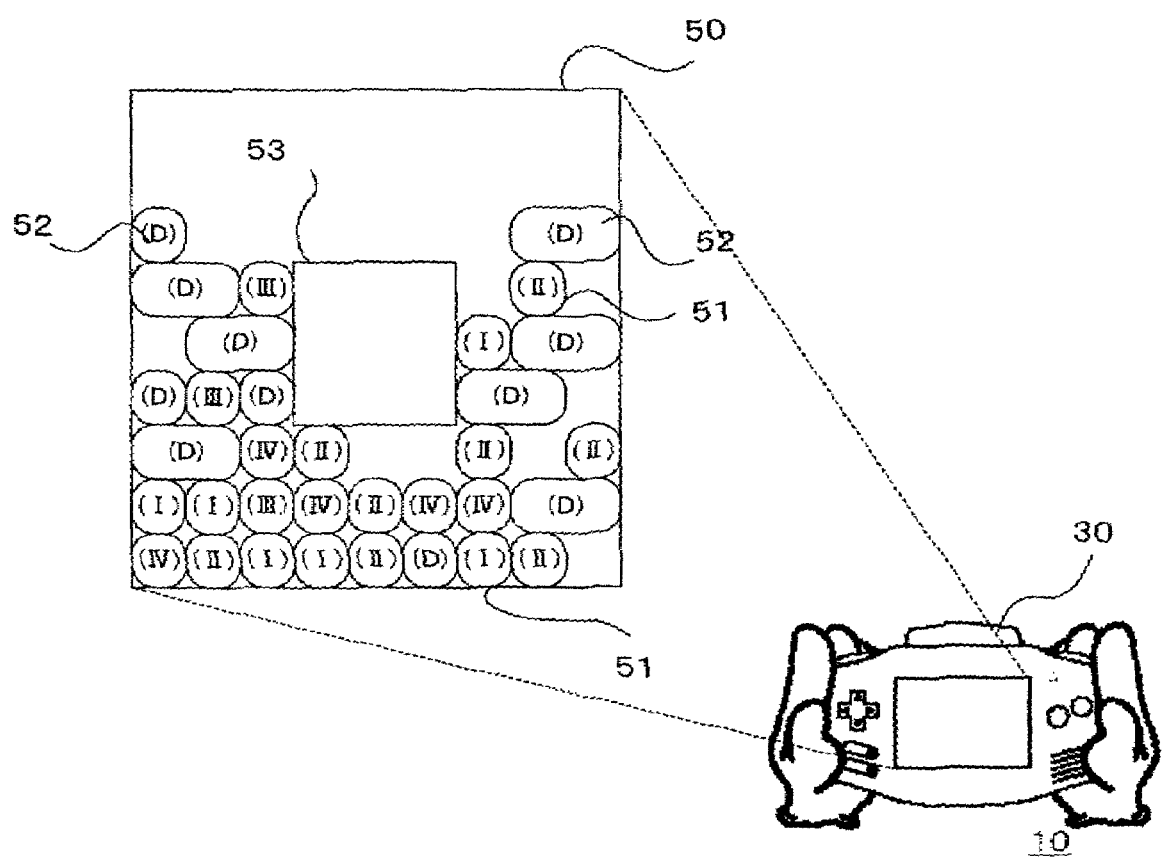
FIG. 4 is an illustration of an exemplary displayed image of a puzzle game according to the present non-limiting exemplary embodiment.

Next, referring to FIG. 4, an outline of the puzzle game according to the present invention will be described. As shown in FIG. 4, a displayed image 50 of the puzzle game is displayed on the LCD 12. In an initial image which exists before the game is started, a plurality of puzzle elements 51 at least having attributes are displayed. The puzzle elements 51 are blocks (also referred to as "erasable blocks" herein) which are to be erased when they take a predetermined arrangement. The present example illustrates a case where the puzzle elements 51 may have four kinds of attributes, e.g., "I", "II", "III", and "IV". As used herein, an "attribute" of a puzzle element is an identifier defining the character, look, etc., of the puzzle element, as distinguished in terms of colors, names, and/or shapes, etc. The present example illustrates an exemplary puzzle game in which a plurality of puzzle elements 51 taking a predetermined arrangement are erased and disappear. The "predetermined arrangement" may be a contiguous sequence or line consisting of a certain number of puzzle elements 51 of the same attribute, or any predetermined pattern (e.g., a checker pattern) consisting of a number of puzzle elements 51 of different attributes, and so on. For conciseness, the following description will be directed to the case where the "predetermined arrangement" is defined as a contiguous sequence consisting of a certain number of puzzle elements 51 of the same attribute.

In this exemplary puzzle game, as a player tilts the game apparatus 10, the plurality of puzzle elements 51 shown in the displayed image 50 are moved in the tilt direction. If the displayed state after the movement is such that three or more contiguous puzzle elements 51 of the same attribute (I), (II) or (III) are present, such puzzle elements 51 are erased. The idea of the game is to try to erase as many puzzle elements 51 as possible within a predetermined period of time by repeatedly performing such operations and processing.

Moreover, in order to increase the difficulty of the game so as to prevent easy game clearance or to require a high level of strategy-making on the part of the player, disturber blocks 52 and/or obstacle blocks 53 may be generated as necessary. As defined herein, each disturber block 52 has an attribute which is different from that of the erasable puzzle elements (erasable blocks) 51, and may appear at a randomly selected coordinate position or move into the displayed image in a specific direction. The disturber blocks 52, although moved similarly to the puzzle elements 51 in accordance with the tilt of the game apparatus 10, serve to prevent puzzle elements 51 of the same attribute from being favorably aligned. Each obstacle block 53 is a block which is displayed at a specific coordinate position in the displayed image in a stationary manner; that is, the obstacle blocks 53 will not move even if the game apparatus 10 is tilted.

Figure 5:
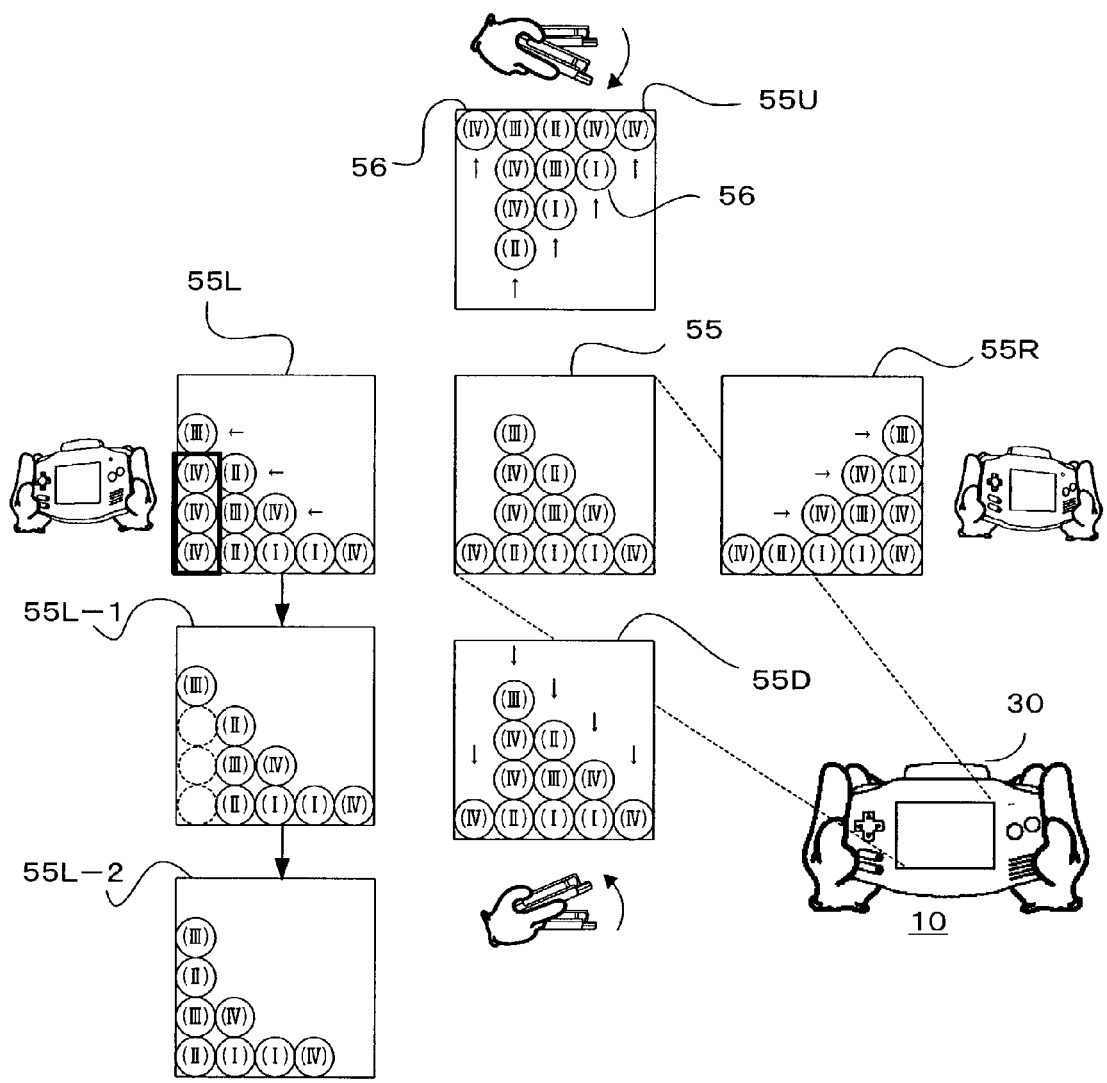
FIG. 5 is an illustration of image transformations on a game apparatus according to the present non-limiting exemplary embodiment, involving movements and consequential erasure of puzzle elements as caused by tilts of the game apparatus.
Figure 6A:
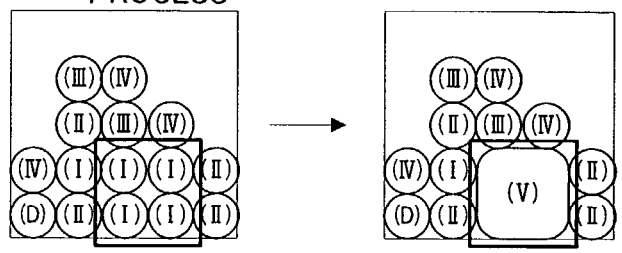
FIGS. 6A, 6B, 6C and 6D are illustrations of exemplary puzzle element arrangements and other kinds of consequential image transformations according to the present non-limiting exemplary embodiment.
Figure 6B:
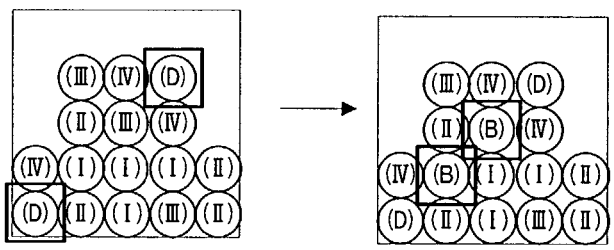
Figure 6C:
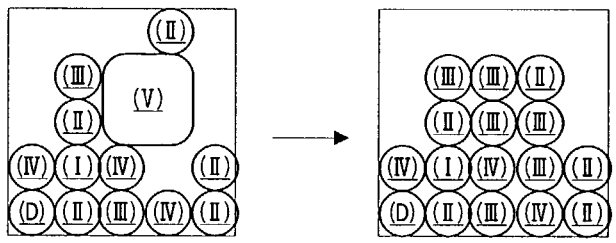
Figure 6D:
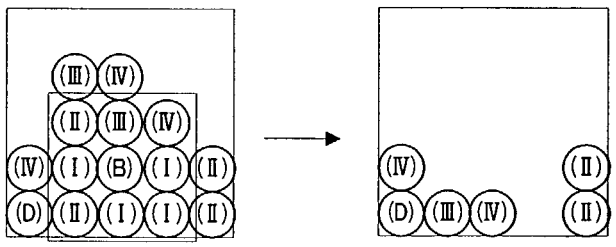

Next, referring to FIG. 5, image transformations concerning the puzzle element 51 which take place when the game apparatus 10 is tilted in the top, bottom, right, or left direction, and the associated game processing will be briefly described. As exemplified by a displayed image 55 (i.e., the second image from the left in the second row from the top), in a start image (initial state) where the game apparatus 10 is maintained in a substantially horizontal position, it is assumed that no alignment of a predetermined number (e.g., three) of puzzle elements 51 of the same attribute (which may be any of "I" to "IV") has been made yet.

When the game apparatus 10 is tilted in the right direction (hereinafter referred to as a "right tilt"), this right tilt is detected by the tilt acceleration sensor 31. Accordingly, as indicated in a displayed image 55R, any of the puzzle elements 51 on the display screen 12 that is neighbored by a vacancy (i.e., a blank block) to the right is moved right. In this example, as shown in the displayed image 55R, the puzzle elements 56 (IV, III, IV) in the second row from the bottom will be moved right by one block each, the puzzle elements 51 (IV, II) in the third row from the bottom will be moved right by two blocks each, and the puzzle element 51(III) in the fourth row from the bottom will be moved right by three blocks. The puzzle elements 51 in the bottom row will not be moved at all since there is no vacancy to the right. Note that these rightward movements of the puzzle elements 51 in the second to fourth rows from the bottom will not result in the erasure of any puzzle elements because no three puzzle elements 51 in any of the rows after the movements are of the same attribute.

On the other hand, when the game apparatus 10 is tilted left, the acceleration sensor 31 detects a tilt in the left direction (hereinafter referred to as a "left tilt"), as indicated in the displayed image 55L, the puzzle elements 51 (IV, III, IV) in the second row from the bottom, the puzzle elements 51 (IV, II) in the third row from the bottom, and the puzzle element 51 (III) in the fourth row from the bottom will be all moved left by one block each. The results of these movements are as follows. Since the lowest three puzzle elements 51 in the leftmost column are of the same attribute "IV" (as indicated within a solid-line box in a displayed image 55L), the predetermined number of puzzle elements 51 of the same attribute "IV" are erased (i.e., vacancies or blank blocks are displayed instead), as further indicated in a displayed image 55L-1. Thereafter, the puzzle elements 51 which existed on the right of the predetermined number of puzzle elements 51 of the attribute "IV" (now erased) are moved left to result in a displayed image 55L-2.

The game apparatus 10 may be tilted in any other direction. For example, when the game apparatus 10 is tilted in the top direction (hereinafter referred to as a "top tilt"), the puzzle elements 51 will be moved as indicated in a displayed image 55U. When the game apparatus 10 is tilted in the bottom direction (hereinafter referred to as a "bottom tilt"), the puzzle elements 51 will be moved as indicated in a displayed image 55D. However, in either case, no puzzle elements 51 are erased because there is no alignment of the predetermined number of puzzle elements 51 of the same attribute.

As described above, one or more puzzle elements 51 are moved in the tilt direction of the game apparatus 10. Such movements of puzzle elements according to the tilt of the game apparatus 10 are repeated until the game is cleared, i.e., until there is no more alignment of the predetermined number (or more) of puzzle elements 51 of any single attribute within the displayed image 50 (e.g., each alignment of puzzle elements 51 of any single attribute from "I" to "IV" is equal to or less than two elements long in this exemplary case).

When playing the above-described puzzle game, the player needs to devise strategies as to how to erase as many puzzle elements as possible by taking into consideration the order of tilting the game apparatus 10 in the up, down, right, or left direction, which can be interesting.

The above example illustrates a case where plural puzzle elements 51 are already present in the displayed image 50 in an initial state which exists at the start. Alternatively, the entire displayed image may be kept in a vacant state (i.e., no puzzle elements of any attribute are displayed) until the game apparatus 10 is tilted (optionally followed by the activation of one of the operation switches 13) or an impact is applied to the game apparatus 10. Immediately after the vacant state, a large number of puzzle elements to be displayed in the initial image may be randomly generated so as to be stacked up in the opposite direction to the tilt direction.

Although the image transformation concerning the displayed states of the puzzle elements illustrated in the above example is based on the erasure of a predetermined number of aligned puzzle elements of the same attribute, any other type of image transformation (i.e., change in the displayed state) may also be employed. For example, a predetermined number of aligned puzzle elements of the same attribute may be transformed into a bomb block (B), and the resultant bomb block may proceed to explode the neighboring disturber blocks 52 and/or obstacle blocks 53. As a further example, a predetermined number of aligned puzzle elements of the same attribute may be transformed into one large block (or a "combined block"), and the size of such a combined block (or the number of blocks corresponding to such a combined block) may be counted into the points won by the player.

Next, with reference to FIGS. 6A to 6D, other kinds of image transformation (i.e., change in the displayed state) of puzzle elements will be described in detail. For example, as exemplified by a displayed state 55a, a block combination process may be performed so as to convert a group of four (2×2) adjoining puzzle elements 51 of a given attribute (e.g., "I" in the example shown) into one large block (V) (as indicated within a solidline box). As exemplified by a displayed state 55b, a block attribute change process may be performed so as to covert any puzzle elements ((III) and (I)) interposed between disturber blocks (D) are converted into bomb blocks (B). As exemplified by a displayed state 55c, a block dissolution process may be performed, in response to an operation of one of the operation switches 13 by the player, so as to disrupt a large-sized puzzle element 51 (of attribute "V") into smaller puzzle elements 51 of any arbitrary attribute (e.g., attribute "III"). As exemplified by a displayed state 55d, a block explosion process may be performed such that a square box centered around a bomb block (B) is exploded so as to disappear and become vacant, thereby allowing the other puzzle elements around the exploded puzzle elements to move in accordance with the tilt. It will be appreciated that these image transformations are only exemplary; any other types of image transformation may also be realized.

Next, with reference to FIG. 7, an example will be described where additional blocks, such as new puzzle elements (erasable blocks) 51 and/or disturber blocks 52, are generated within a displayed image 50 on the display screen 12.

As for the condition for introducing additional blocks, additional blocks may be introduced in response to an operation of one of the operation switches 13 by the player, or after the lapse of a predetermined period of time as timed by a timer which is set off upon detection of a tilt of the game apparatus 10. Alternatively, additional puzzle elements may be introduced based on both an operation of a predetermined operation switch and the lapse of a predetermined period of time. By requiring that both conditions be met for additional puzzle elements to be introduced, a higher level of strategy-making will be needed for playing the puzzle game.

Figure 7:
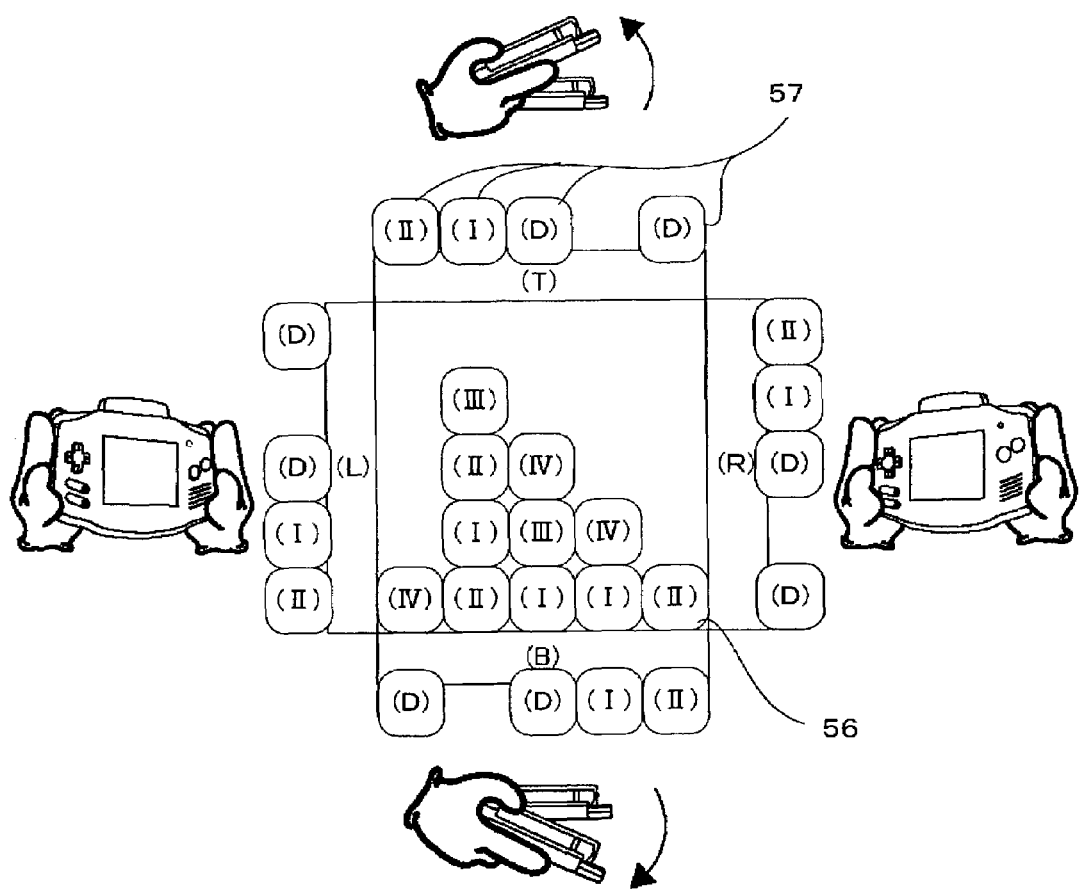
FIG. 7 is a diagram illustrating the relationship between the tilts of the game apparatus according to the present non-limiting exemplary embodiment and the positions at which additional puzzle elements are consequentially introduced.

As shown in FIG. 7, additional blocks may be displayed in such a manner that additional blocks 57 are generated on the left side (LEFT) of the screen in response to a right tilt of the game apparatus 10. The attribute data (e.g., attributes "D", "vacant", "D", "I", "II" as from the top of the displayed image exemplified in FIG. 7) for the blocks (i.e., puzzle elements and/or disturber blocks) which are added from the left side (LEFT) of the screen are previously prepared based on random number data or the like, stored in a register or the like, and written in a data storage area (e.g., the work RAM 26) corresponding to the display screen 12 when the aforementioned condition(s) for generating additional blocks 57 is met.

Similarly, when the game apparatus 10 is tilted left, additional blocks 57 are added from the right side (RIGHT) of the screen. When the game apparatus 10 is tilted in the top direction, additional blocks 57 are added from the bottom side (BOTTOM) of the screen. When the game apparatus 10 is tilted in the bottom direction, additional blocks 57 are added from the top side (TOP) of the screen.

The positions at which to introduce additional blocks are not limited to the opposite side of the direction of the tilt applied to the game apparatus 10. In the case of a puzzle game in which additional blocks are displayed so as to rise from the tilt direction, additional blocks may be introduced from any arbitrary position associated with the tilt direction.

Figure 8:
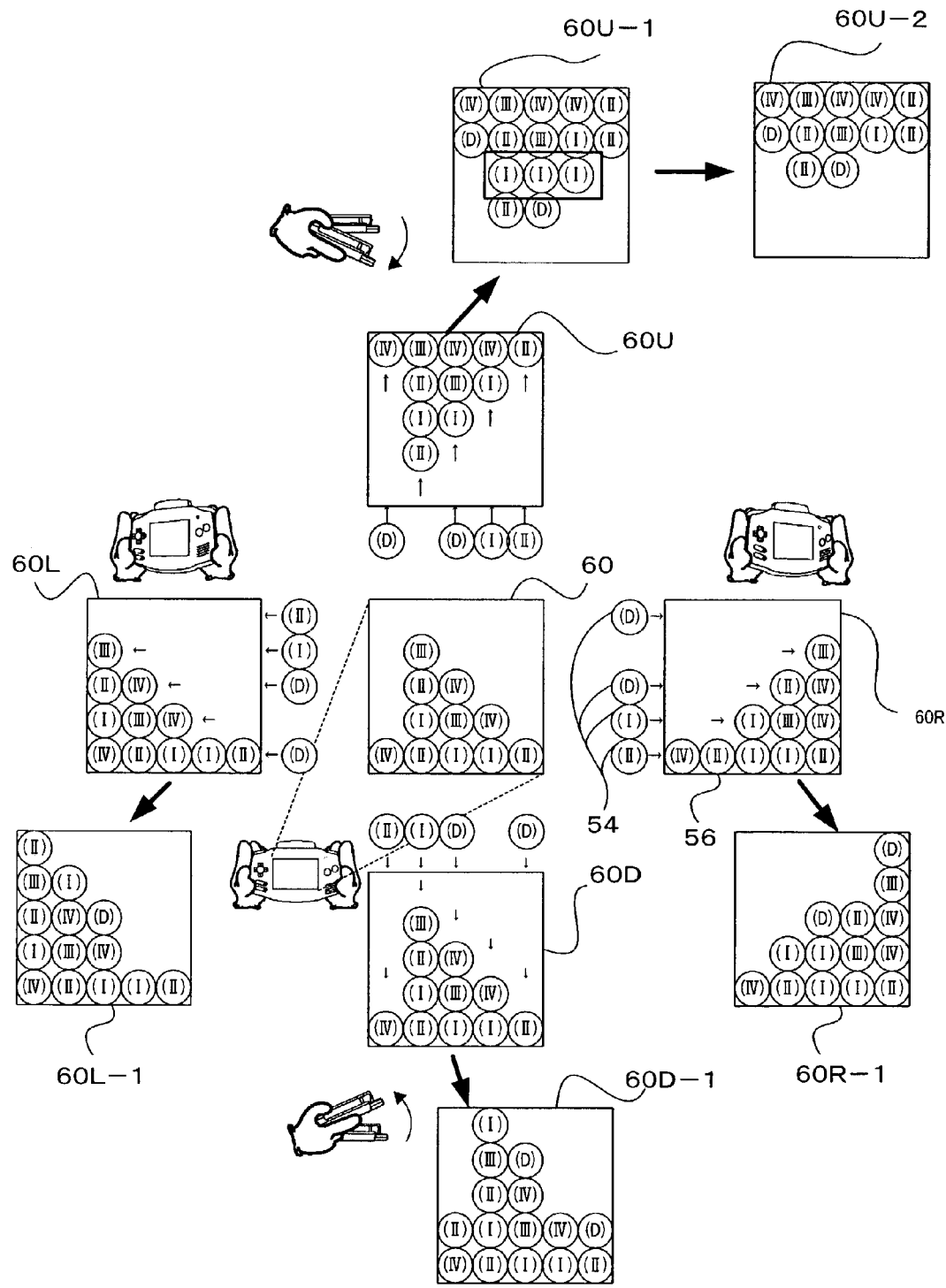
FIG. 8 is an illustration of image transformations on the game apparatus according to the present non-limiting exemplary embodiment, involving additions of puzzle elements and subsequent movements and image transformations concerning the puzzle elements as caused by tilts of the game apparatus.

Next, with reference to FIG. 8, some exemplary displayed images in the case where additional blocks 54 are to be added will be described. In an initial state (as exemplified by a displayed image 60), where the game apparatus 10 is maintained in a substantially horizontal position, it is assumed that the puzzle elements are taking the same positions as in the initial image 55 shown in FIG. 5 (except that the attributes are different). If the game apparatus 10 is tilted left from this state, the plurality of puzzle elements are moved left so as to pile up from the left end and rise toward the right direction, as indicated in a displayed image 60L. Moreover, the additional blocks which were prepared on the opposite end, i.e., the right end, are added and moved left so as to fill the vacancies, resulting in a displayed image 60L-1.

On the other hand, if the game apparatus 10 is tilted right from the initial state, the plurality of puzzle elements are moved right so as to pile up from the right end and rise toward the left direction, as indicated in a displayed image 60R. Moreover, the additional blocks which were prepared on the opposite end, i.e., the left end, are added and moved right so as to fill the vacancies, resulting in a displayed image 60R-1.

Yet on the other hand, if the game apparatus 10 is tilted in the bottom direction from the initial state, the plurality of puzzle elements are moved down so as to pile up from the bottom end and rise toward the top direction, as indicated in a displayed image 60D. Moreover, the additional blocks which were prepared on the opposite end, i.e., the top end, are added and moved down so as to fill the vacancies, resulting in a displayed image 60D-1.

Still on the other hand, if the game apparatus 10 is tilted in the top direction from the initial state, the plurality of puzzle elements are moved up so as to pile up from the top end and rise toward the bottom direction, as indicated in a displayed image 60U. Moreover, the additional blocks which were prepared on the opposite end, i.e., the bottom end, are added and moved up so as to fill the vacancies, resulting in a displayed image 60U-1. At this time, since the three puzzle elements 51 in the third row from the top are of the same attribute (I) (as indicated within a solid-line box in the displayed image 60U-1), the predetermined number (three) of aligned puzzle elements of the attribute "I" are erased. Then, the puzzle elements which were on the bottom side of the predetermined number of aligned puzzle elements of the attribute "I" are moved further up to result in a displayed image 60U-2.

The above example illustrates image transformations each resulting from one tilt of the game apparatus 10 in the up, down, right, or left direction from the initial state (i.e., the displayed image 60). However, it will be appreciated that a number of such tilts may be applied in the same direction, or in different directions, causing additional blocks to be introduced in accordance with respectively different game developments. The image transformations in such cases can be understood as combinations of the above-described processes associated with the respective tilts.

Thus, since image transformation based on the addition of additional blocks 54 occurs in the displayed images in addition to the movement of the puzzle elements 51, a greater variety of game developments can be attained. The puzzle game may be arranged so that no additional blocks 54 are added until the game apparatus 10 is tilted. Although the initial displayed image 50 described above is illustrated to already include a large number of puzzle elements 51 within the displayed image, the puzzle game may instead be arranged so that the displayed image is kept vacant until a tilt is applied and that a predetermined number of erasable blocks are stacked up on the side toward which the tilt is made only after the application of a tilt. Alternatively, the displayed image may be kept vacant until an operation of one of the operation switches 13 is made by the player, and a predetermined number of additional blocks may be stacked up on the side toward which the tilt is made as soon as an input is made by means of the operation switch 13. Thus, various initial images are possible.

Next, the specific operations of performing game processing in accordance with this exemplary puzzle game program will be described.

Figure 9:
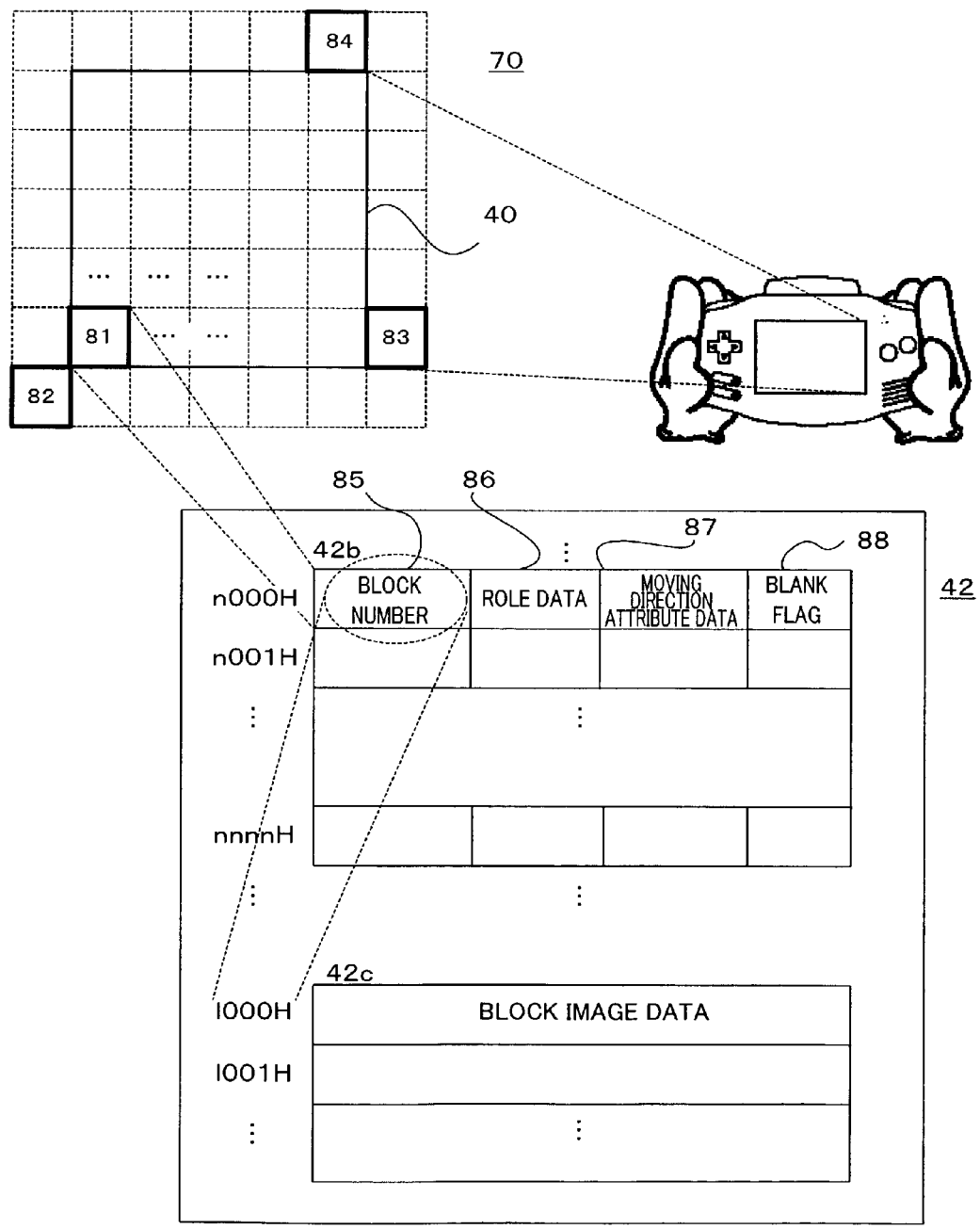
FIG. 9 is a diagram illustrating a manner in which display data for puzzle elements are allocated in connection with a memory map of the attribute data and actual picture data for puzzle elements used in game processing according to the present non-limiting exemplary embodiment.

FIG. 9 is a diagram illustrating the relationship between the data storage area 42 and actual picture data used in game processing, in connection with the memory map described with reference to FIG. 3.

First, the manner of coordinate referencing used in the game processing will be described. The game map 70 on which the game takes place is divided into blocks. Each block is referenced in terms of a set of coordinates (X, Y). In order to allow for the addition of additional blocks, the game map 70 is designed so as to include an extra area on each of the four sides of the displayed image which is to be actually displayed on the display screen 12 of the game apparatus, each extra area being one block wide. The reason why a space for adding additional blocks is prepared on every one of the four sides of the displayed image is because the position at which blocks are added will vary depending on the tilt direction, as shown in FIG. 8. The solid-line frame (5×5 blocks) on the game map 70 defines the actually displayed area.

The coordinate values are assigned in the following manner in the present example. For conciseness, a block 81 corresponding to the bottom left corner of the frame is assigned with coordinate values (X, Y)=(0, 0), thus facilitating the processing required when blocks are added from the top of the display screen. A maximum value xmax of x coordinate values is set to correspond to just within the right side border line (as shown by FIG. 9) of the displayed image. A maximum value ymax of y coordinate values is set to be within the extra area for additional blocks, above the top border line (as shown by FIG. 9) of the displayed image. Thus, a block 82 has coordinates (−1, −1); a block 83 has coordinates (xmax+1, 0); and a block 84 has coordinates (xmax, ymax). The entire displayed image spans an area from coordinates (0, 0) to coordinates (xmax, ymax−1).

In the game map data storage area 42b, addresses corresponding to the coordinates of the respective blocks in the game map 70 are set. At a position in the WRAM 26 corresponding to each one of these addresses, the attribute data for an associated block is written. One unit of attribute data comprises a block number 85, role data 86, moving direction attribute data 87, and a blank flag 88. The block number 85 is data representing an address in the block image data storage area 42c used for displaying an image of the associated block. The role data 86 represents a role of the block, whether it is an erasable block, a disturber block, or the like. The moving direction attribute data 87 represents a direction in which to move the block relative to the tilt direction of the game apparatus 10. The blank flag 88 is used for an erasure process for the block.

Figure 10:
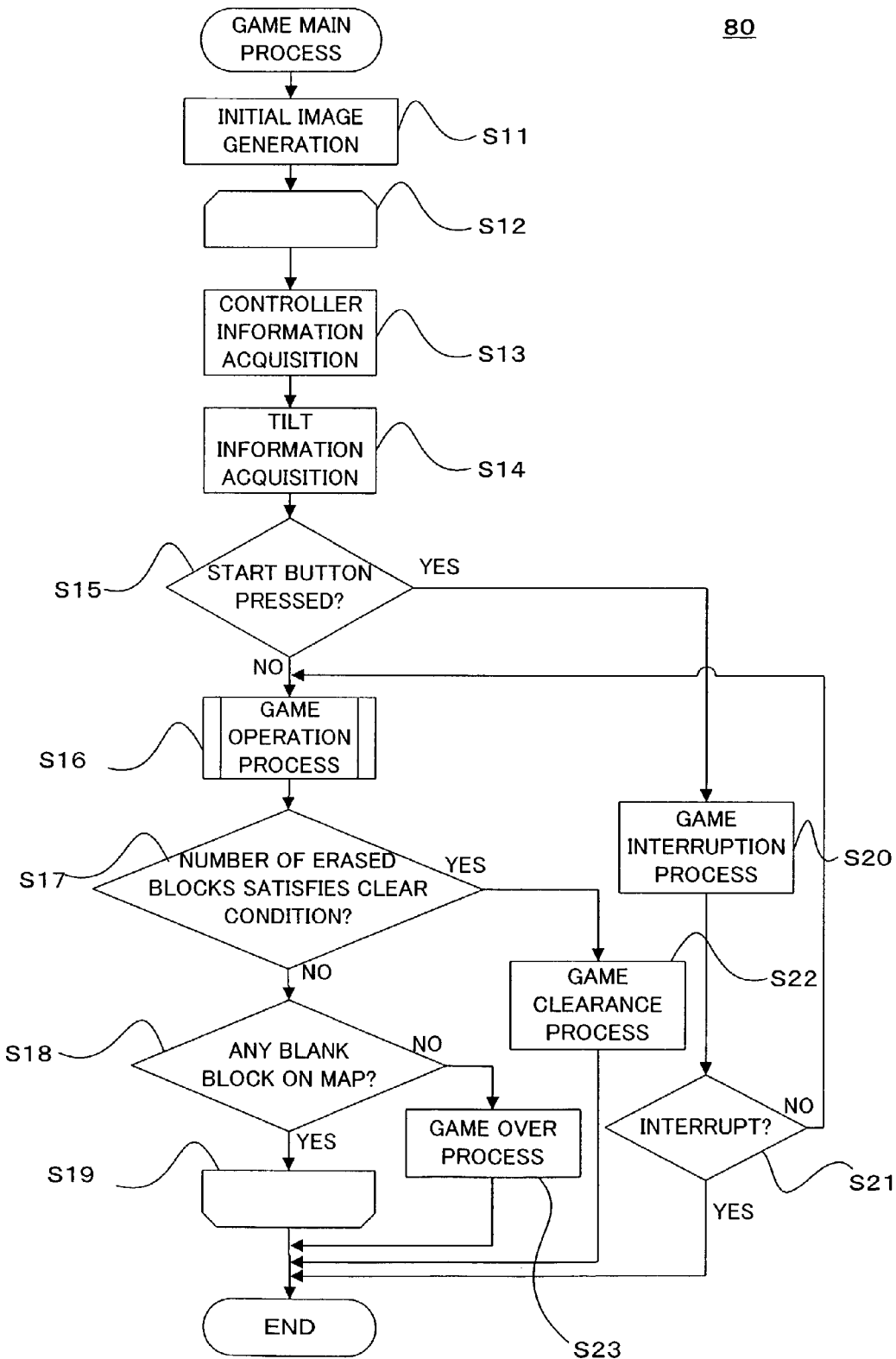
FIG. 10 is a flowchart of a main program used in a puzzle game according to the present non-limiting exemplary embodiment.

FIG. 10 shows a flowchart 80 of a main program used in a puzzle game according to the present invention. The puzzle game according to the present invention is basically executed by repeating the processing between steps 12 and 19 shown in FIG. 10. First, at step S11, an initial image to be displayed at the time the game is started, i.e., before the game apparatus 10 is tilted, is generated. An example of the initial image may be the displayed image 50 shown in FIG. 5. Various methods for generating the initial image are possible. For example, an initial image may be automatically displayed after the game is started, or once a tilt occurs in a certain direction, blocks may fall or rise from a direction corresponding to the tilt. The trigger for displaying such an initial image is not limited to a tilt, but may be an operation of one of the operation switches 13 by a player.

Next, at step S13, operation information concerning whether or not the player has operated one of the operation switches 13 of the game apparatus 10 is obtained. Next, at step S14, information concerning the tilt direction, i.e., the direction of tilt being applied by the player to the game apparatus 10, is obtained from the X/Y axes acceleration sensor 31. The specific method for ascertaining tilt direction based on the output from the acceleration sensor 31 will be described later. Next, at step S15, it is detected whether the start button 14 of the game apparatus 10 is pressed or not. If the start button is not pressed, control proceeds to a game operation process at step S16.

In the game operation process of step S16, the player performs a game operation to erase an erasable block(s) 51. Next, at step S17, the cumulative number of erased blocks is checked. If it is determined based on this number that the game has not been cleared at step S17, control proceeds to step S18 to determine whether any blank blocks exist in the game map. If no blank blocks exist on the game map, it is confirmed that the blocks are now stuck in a certain direction within the displayed image, i.e., it is no longer possible to continue the game playing. If any blank blocks are present on the game map, it is still possible to continue the game playing, and therefore control proceeds to step S19 to repeat the above-described game processing.

On the other hand, if it is determined at step S15 that the start button is pressed, then the game processing is interrupted at step S20. Then, the player is allowed to choose whether or not to interrupt the game at step S21. If the player chooses to interrupt the game, the game is interrupted. If the player does not choose to interrupt the game, control proceeds to step S16 to continue game processing.

If it is determined at step S17 that a predetermined number of blocks have been erased, it is determined that the game has been cleared, and control proceeds to step S22 to perform a game clearance process. The condition for determining game clearance is not limited to a predetermined number of blocks having been erased; any other condition may be employed instead. Furthermore, if it is determined at step S18 that no blank blocks exist, control proceeds to step S23 to perform a game over process.

Figure 11:
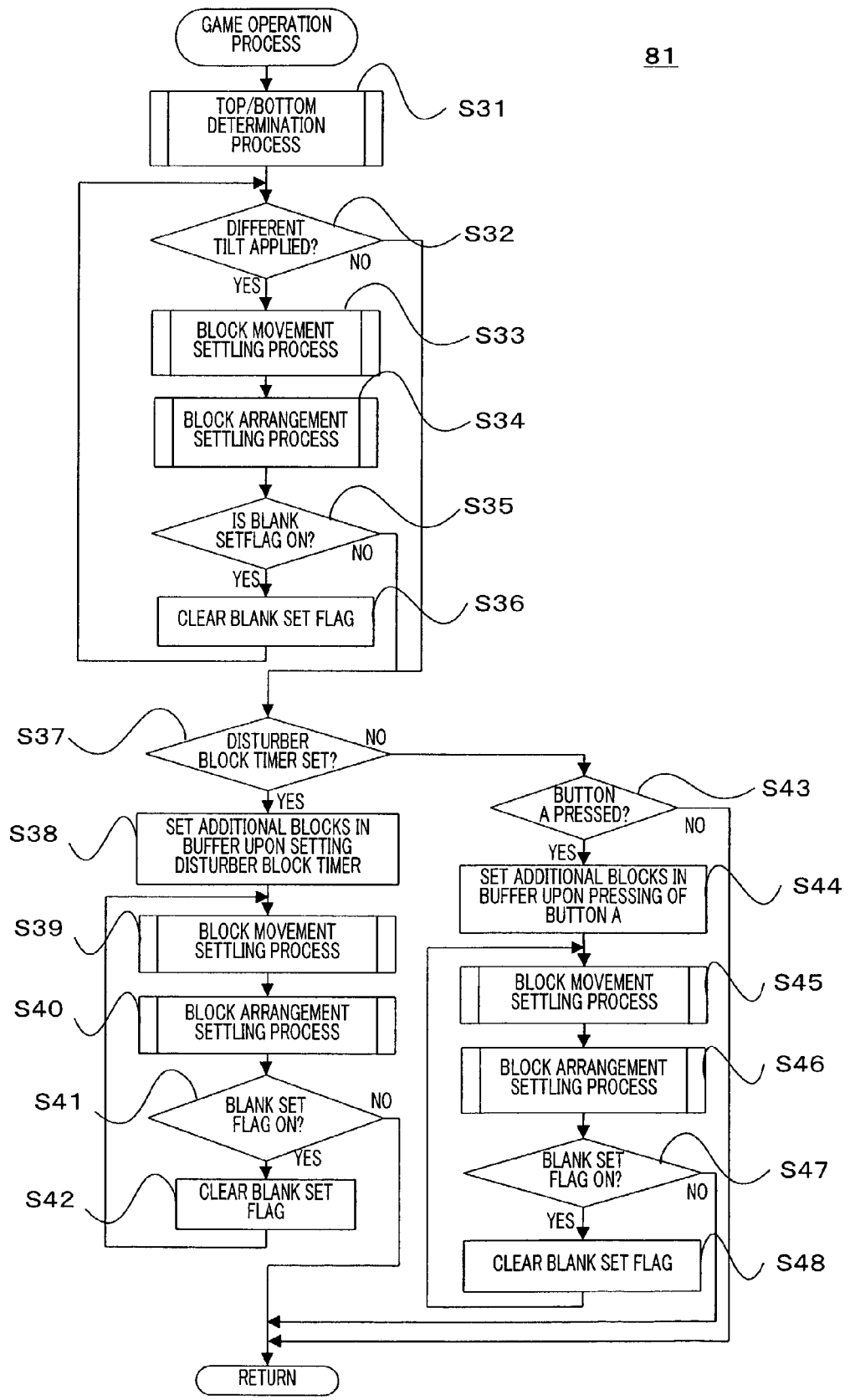
FIG. 11 is a flowchart of a game operation process in the puzzle game according to the present non-limiting exemplary embodiment.

FIG. 11 is a flowchart 81 of a specific example of a game operation process corresponding to step S16 in FIG. 10. At step S31, a top/bottom determination process (described later with reference to FIG. 12) is performed. The top/bottom determination process of step S31 determines a tilt direction of the game apparatus 10, and a direction in which to move the puzzle elements 51 (hereinafter referred to as a "moving direction") is determined.

After the first instance of the top/bottom determination process of step S31, control proceeds directly to a block movement settling process at step S33. Note that the flowchart 81 does not explicitly show a step for determining a first instance in order to concisely show a repetitive flow of the overall game processing. After the second or any subsequent instance of the top/bottom determination of step S31, control proceeds to step S32 to confirm whether the player has applied a different tilt to the game apparatus 10 since the last tilt. If such an operation has been made, control proceeds to the block movement settling process at step S33 (described later with reference to FIG. 13) to perform processing for moving the puzzle elements 51.

Next, a block arrangement settling process at step S34 is performed (described later with reference to FIG. 15). The block arrangement settling process determines what sort of relationship a given puzzle element 51 has with respect to the other puzzle elements or blocks, and if it is of a predetermined relationship, erases the puzzle element, for example.

In FIG. 11, after the block arrangement settling process of step S34 is completed, control proceeds to step S35. At step S35, if a blank set flag (not shown) which was used in the block arrangement settling process to erase a puzzle element 51 is found to be still ON, the flag is cleared, and control returns to step S32.

If it is determined at step S32 that no further tilt has been applied, or if it is determined at step S35 that the blank flag is not ON, control proceeds to step S37. The flow according to the present example is designed in such a manner that additional blocks will be introduced after the lapse of a predetermined period of time, and that control proceeds from S32 or S35 to step S37 if the movement or erasure of blocks due to a tilt has been completed. At step S37, a timer (not shown) is set, and additional blocks are added after the lapse of a predetermined period of time (step S38). Note that any additional blocks will first be added at ymax on the game map 70, so that they are not readily seen in the displayed image immediately after the addition. After the addition of the additional blocks, the subsequent processing, a block movement settling process at S39 and a block arrangement settling process at S40 are performed in identical manners to the processing after the tilt detection at step S32. Upon confirming at step S42 that no more blocks are to be erased, the game operation process of step S16 in FIG. 10 is ended.

Even if the timer is not set at step S37, additional blocks can be introduced in response to an operation of one of the operation switches 13 by the player according to the present example. If such an operation of an operation switch is made (step S43), additional blocks are introduced (step S44). As is the case with the additional blocks introduced in conjunction with the aforementioned timer, the additional blocks introduced at step S44 will first be added at ymax on the game map 70. A block movement settling process (step S45) and an erasure process (step S46) are further performed, and upon confirming that no more blocks are to be erased (step S48), the game operation process is ended.

If the timer is not set at step S37 and no operation is made on the operation switches at step S43, the game operation process is ended, and control returns to the main process 80.

Next, the top/bottom determination process of step S31 will be described in detail with reference to FIG. 12.

First, tilt information is obtained at step S14 in FIG. 10. As used herein, the "tilt information" comprises output values from the acceleration sensor 31 respectively corresponding to a tilt in a right-left direction of the game display screen 12 and a tilt in a top-bottom direction of the game display screen 12. The acceleration sensor 31 outputs signals such that a duty ratio of one cycle of the pulse signal varies in accordance with an acceleration occurring in the right-left direction and an acceleration occurring in the top-bottom direction. The sensor interface 33 includes a counter which measures the duration of High level signal pulses outputted from the acceleration sensor 31 with respect to the right-left direction and the top-bottom direction, in accordance with an internal clock of the game apparatus 10. Thus, based on the counter values (xa, ya), it is possible to determine the tilt direction of the game apparatus 10.

Figure 12:
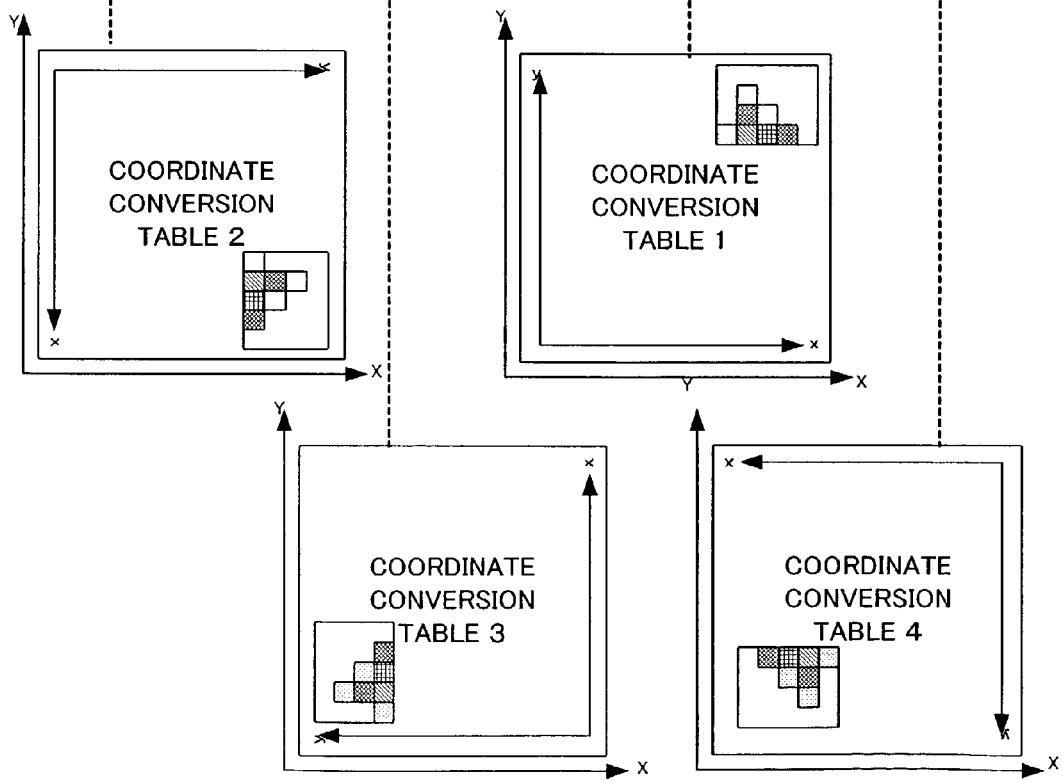
FIG. 12 is a flowchart of a top/bottom determination process in relation to tilts applied to the game apparatus according to the present non-limiting exemplary embodiment.

In the top/bottom determination process flowchart in FIG. 12, step S51 performs the following calculations by using the counter values with respect to the top-bottom direction and the right-left direction for the game apparatus in a horizontal position as initial values (xBase, yBase), thereby obtaining respective accelerations:

$$A1=(xa-xBase)*SenX$$

$$A2=(ya-yBase)*SenY \quad \text{eq. 1}$$

In eq. 1, SenX and SenY are arbitrarily-selected correction factors for the right-left direction and the top-bottom direction, respectively.

Next, at step S52, the tilt directions along the right-left direction and the top-bottom direction are confirmed based on absolute values |A1| and |A2| for A1 and A2 as follows.

If |A1|≧|A2|, then the tilt is determined to be in a right-left direction. Furthermore, if xa−xBase<0, the tilt is in the left direction, that is, the game machine 10 is determined to be tilted toward the left side of the game display screen. On the other hand, if the tilt is determined to be in a right-left direction and if xa−xBase≧0, then the game machine 10 is determined to be tilted toward the right side of the game display screen.

Similarly, if |A1|<|A2|, then the tilt is determined to be in the top-bottom direction. Furthermore, if ya−yBase≧0, it is determined that the game machine 10 is tilted so that the top of the display screen is raised. On the other hand, if the tilt is determined to be in a top-bottom direction and if ya−yBase<0, then it is determined that the game machine 10 is tilted so that the bottom of the display screen is raised.

Although the output from the acceleration sensor 31 is utilized to detect a tilt direction in the present example, other processing would also be possible based on the output from the acceleration sensor 31. Other than a tilt of the game apparatus, acceleration will occur as a result of moving the game apparatus in any direction; such an event can be detected and regarded as a direction in which the game apparatus is moved, and the blocks may be moved in the direction that the game apparatus is moved. Since the acceleration also varies depending on the speed of the tilting movement, the pulse duration of the output from the acceleration sensor 31 may also be checked to further vary the speed of moving the blocks within the displayed image or to introduce limitations to the distances over which the blocks are moved. Moreover, since any substantial impact applied to the game apparatus can draw an output from the acceleration sensor 31, this may be utilized as a trigger for introducing additional blocks. For example, the game apparatus may be hit by the player from a specific direction, and additional blocks may introduced from that direction. Thus, it will be appreciated that the present is a mere illustration of a specific case of utilizing the output from the acceleration sensor for the detection of a tilt direction.

In the above-described tilt direction determination method, it would seem that a block movement process and a block erasure process are required for each of the four tilt directions and program processing needs to be performed individually with respect to each direction. However, given that erasable blocks 41 are to be moved in the tilt direction, the game processing will always be the same with respect to each given tilt direction. Therefore, in the present example, processing is performed based on relative coordinates in order to uniformize the processing after a tilt direction is determined, thereby downscaling the program in quantity and consequently reducing the memory resource required for. the program.

A game map when the game apparatus 10 is held in the hands of a player can be represented in terms of absolute coordinates (X, Y). Furthermore, relative coordinates (x, y) are defined, where a tilt direction is designated as a −y direction and a perpendicular axis thereto is designated as an x direction. Based on the above definitions of relative coordinates, it will be appreciated that the relative coordinates would coincide with the absolute coordinates when the game machine 10 is tilted in the bottom direction, i.e., so that the top of the game screen is raised. In accordance with the tilt direction determined at step S52, tables for converting relative coordinates (x, y) into absolute coordinates (X, Y) are set at step S53.

Specifically, in the case where a bottom tilt is applied, the absolute coordinates (X, Y) will be:

$$(X, Y)=(x, y);$$

in the case where a top tilt is applied, the absolute coordinates (X, Y) will be:

$$(X, Y)=(xmax-x, (ymax-1)-y);$$

in the case where a right tilt is applied, the absolute coordinates (X, Y) will be:

$$(X, Y)=((ymax-1)-y, x); \text{ and}$$

in the case where a left tilt is applied, the absolute coordinates (X, Y) will be:

(X, Y)=(y, xmax−x).

As described above, any block whose y coordinate is ymax is a block waiting outside the display screen to be additionally introduced.

Figure 13:
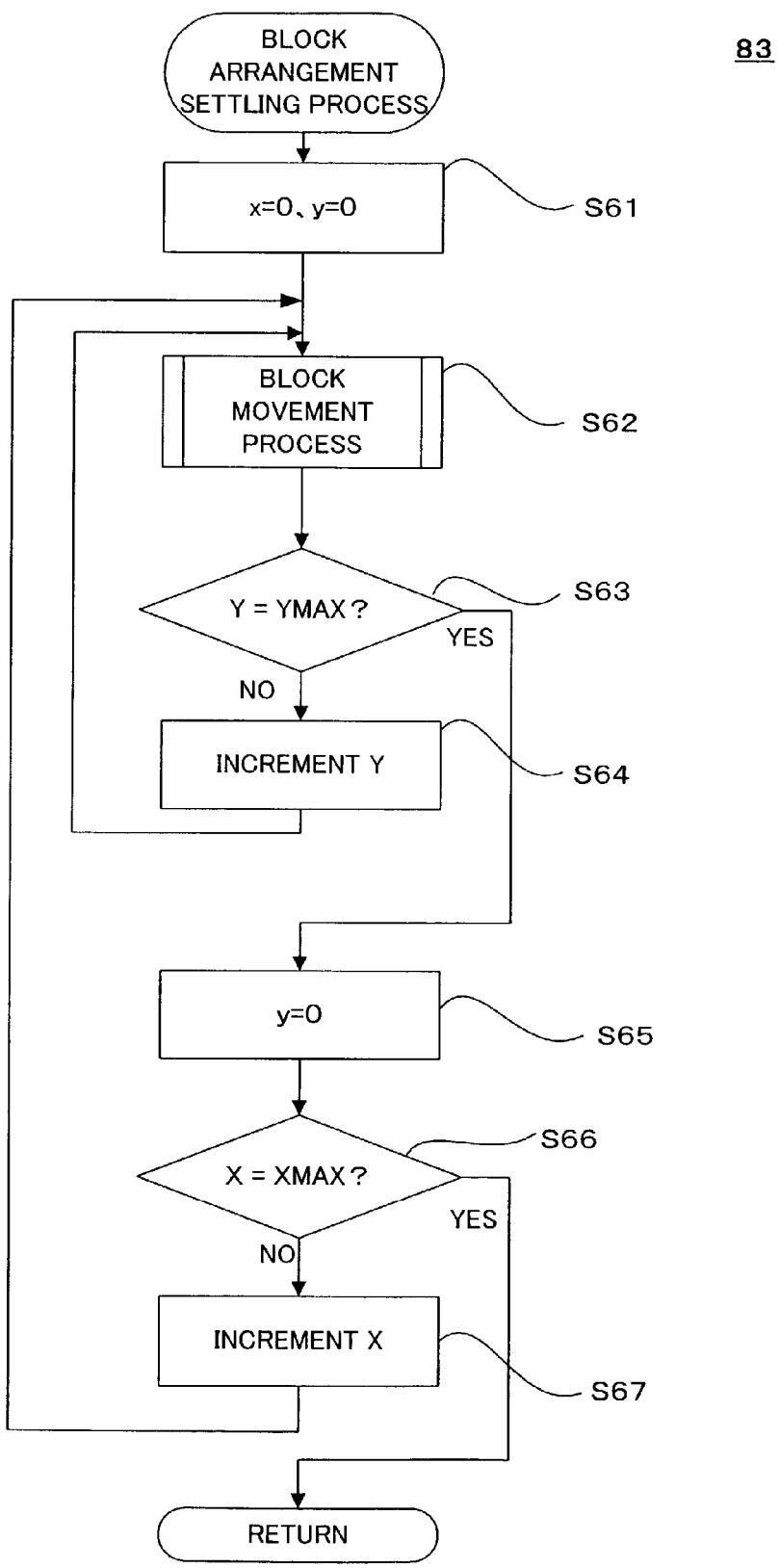
FIG. 13 is a flowchart of a movement process for the puzzle elements in the puzzle game according to the present non-limiting exemplary embodiment.

Now, the block movement settling processes of steps S33, S39, and S45 in the flowchart of FIG. 11 will be specifically described with reference to FIG. 13. In summary, the block movement settling process repetitively performs processing which involves: checking a displayed image in a block-by-block manner; and, if any blank block that adjoins an erasable block in the −y direction is located, switching the positions of the two blocks in the displayed image. At step S61, initial coordinate values (e.g., (0, 0) in the illustrated example) for blocks are set before beginning to determine whether each block is to be moved in the displayed image. At step S62, a block movement process is performed. The block movement process will be described in more detail later with reference to FIG. 14.

After the block movement process is performed, it is determined at step S63 whether the block movement process has been performed with respect to all of the blocks present along the y direction. If the block movement process has been performed with respect to all of the blocks present along the y direction, the y coordinate value is incremented at step S64 so that the block of interest is shifted to the next block. Thereafter, control returns to step S62. Thus, any blank block having a given x coordinate value is switched with another block adjoining the blank block in the y direction, such that a blank block is now placed where the other block used to be. Such processing is performed for all of the blocks present along the y direction, thereby causing the blocks to be piled up in the y direction without spaces therebetween.

Once the processing for the given x coordinate value is completed all the way along the y direction, similar processing is performed for the blocks having a next x coordinate value. In order to achieve this, the y coordinate value is returned to zero at step S65. Then, it is determined at step S66 whether the x coordinate has reached xmax or not. If not, the x coordinate value is incremented at step S67. Then control returns to step S62, to repeat block movement process for the new x coordinate value. If it is determined at step S66 that the x coordinate value has reached the maximum value xmax, the block movement settling process is finished.

The above-described block movement settling process is directed to an embodiment where the moving blocks all appear to fall in the −y direction, irrespective of the attribute data 87 concerning the moving directions. Alternatively, it is possible to apply different types of movement settling processes depending on the value of the attribute data 87.

Figure 14:
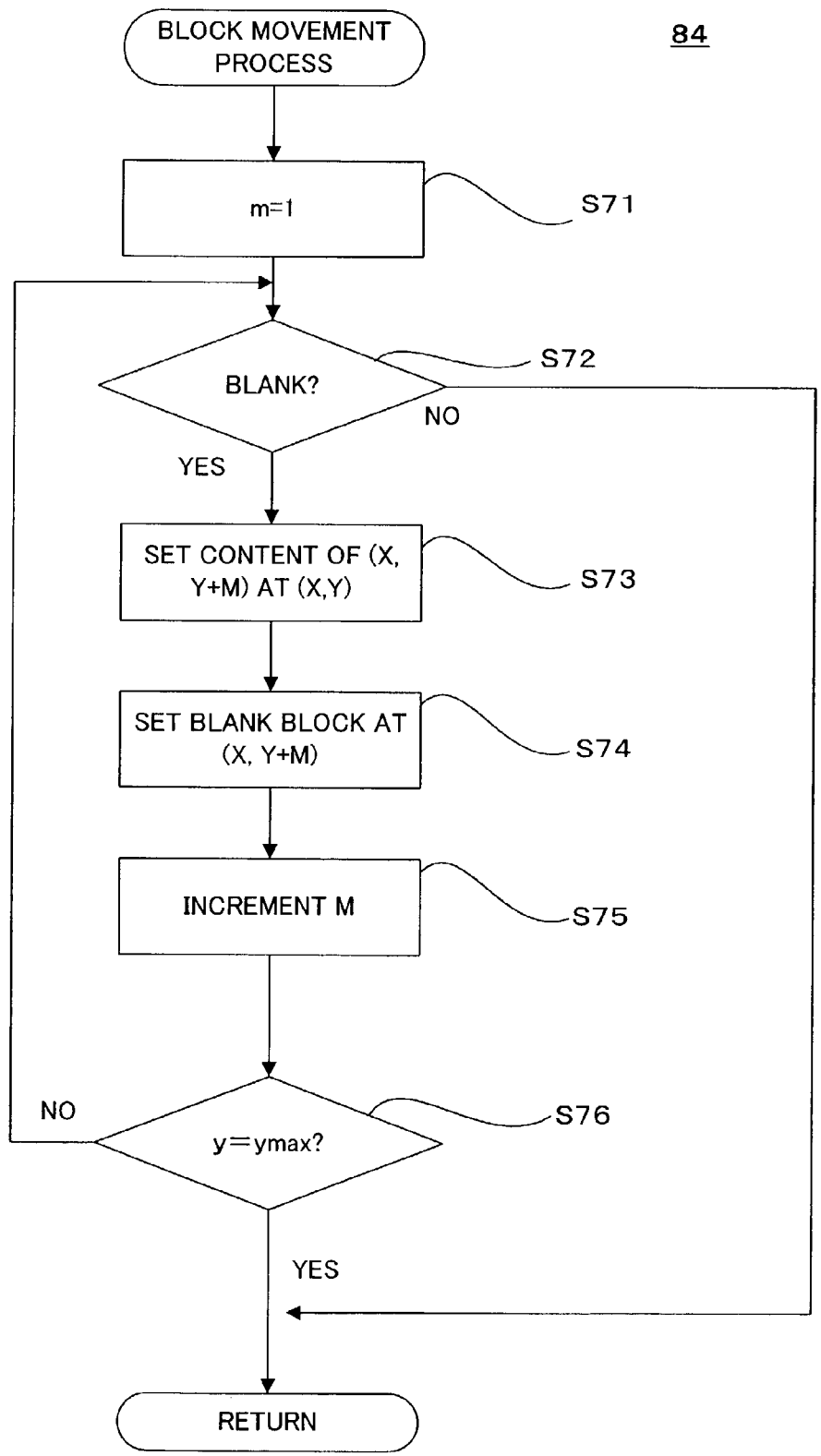
FIG. 14 is a detailed flowchart of a block movement process in the puzzle game according to the present non-limiting exemplary embodiment.

FIG. 14 is a flowchart 84 of a block movement process. At step S71, an initial value of a value m, which is an increment to be applied to the y coordinate value within a loop process to follow is set. At step S72, it is determined whether a block having the initial coordinate values ("block of interest") is a blank block or not. If it is a blank block, the block of interest is switched with another block adjoining the block of interest in the y direction at step S73. At step S74, a blank block is placed where the other block used to be. Then, the y coordinate value is incremented at step S75. At step S76, it is determined whether the coordinate value along the y direction has reached the maximum value ymax or not. If not, similar processing is repeated until the y coordinate value reaches ymax.

Referring back to FIG. 11, if the block movement settling process of step S33 is completed, control proceeds to step S34. If a plurality of blocks are found to be arranged in accordance with predetermined rules in the game process, as shown in FIG. 5, processing for causing a change, e.g., an image transformation concerning such blocks is performed. The block arrangement settling process of step S34 will now be described in detail with reference to FIG. 15.

Figure 15:
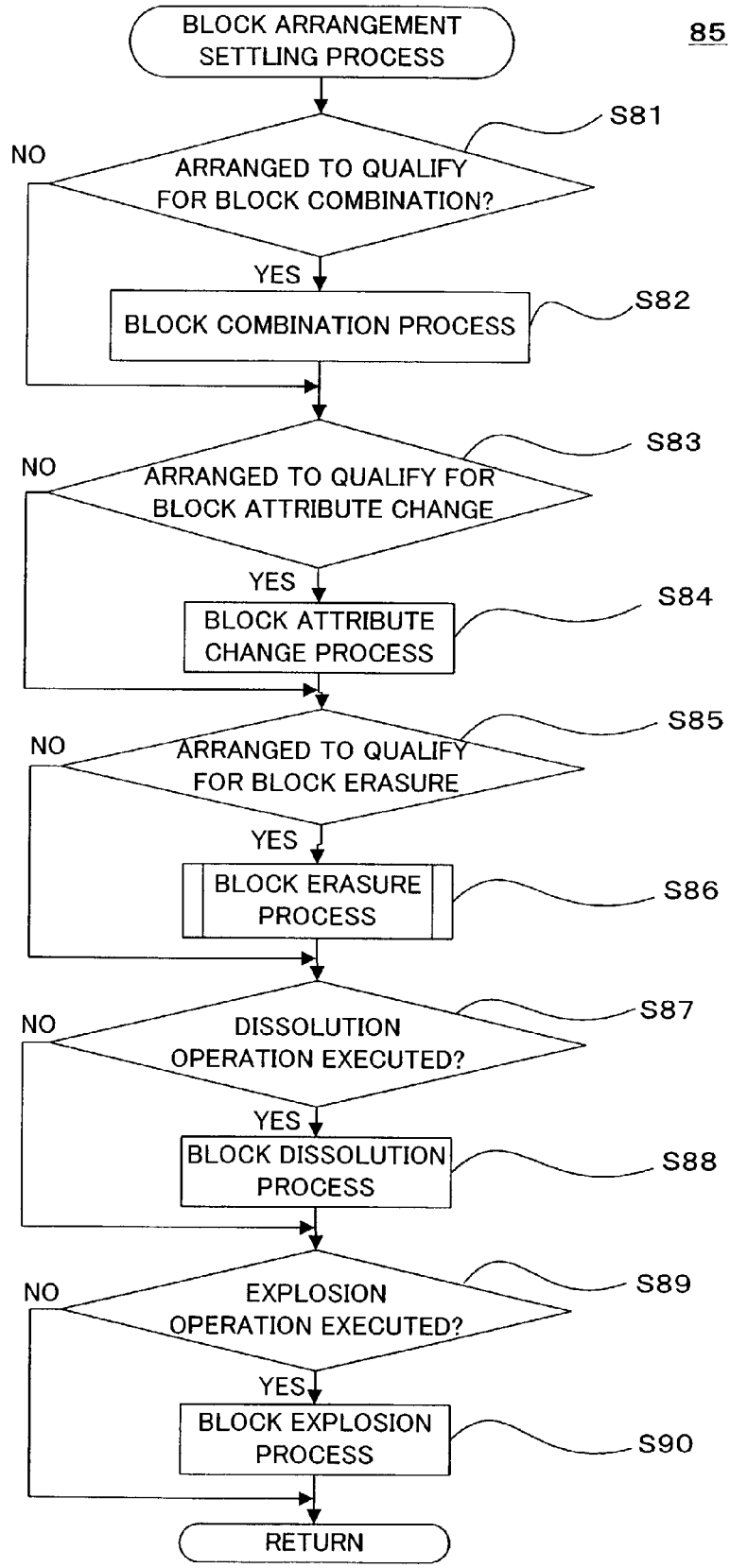
FIG. 15 is a flowchart of a process of determining puzzle element arrangement in the puzzle game according to the present non-limiting exemplary embodiment and performing processes in accordance with the determination results.

Referring to FIG. 15, it is first determined at step S81 whether or not a plurality of blocks are arranged in such a manner as to qualify for being combined together. If so, as exemplified by the display state 50*a* shown in FIG. 6A, the displayed image is changed by combing such blocks (step S82). In this example, only the blocks which are indicated as combinable blocks in the role data 86 (FIG. 9) are subjected to this processing. If the blocks are not to be combined, control proceeds to step S83 to determine whether or not a plurality of blocks are arranged in such a manner as to qualify for a change in attribute. If so, as exemplified by the display state 50*b* shown in FIG. 6B, the attributes of the relevant blocks are changed at step S84. In this case, too, the processing is performed only with respect to the blocks which are indicated as attribute changers in the role data 86 (FIG. 9). In the case where no change in the attributes of the blocks is to occur, control proceeds to step S85 to determine whether or not the blocks are arranged in such a manner as to qualify for a block erasure process at step S86. The block erasure process will be described in more detail with reference to FIG. 16. Examples of image transformations occurring as a result of an erasure process have been described with reference to FIGS. 5 and 8.

If an erasure process is not to be performed, control proceeds to step S87. Note that the operation members 13 may be set so as to invoke different types of arrangement settling processes depending on the particular operation performed on the operation members 13, such that a block dissolution process at step S88 (as exemplified by the displayed image 50*c* shown in FIG. 6C) will be invoked by a certain operation and that a block explosion process at step S89 (as exemplified by the displayed image 50*d* shown in FIG. 6D) will be invoked by another operation.

Although the above description illustrates a block combination process, a block attribute change process, a block erasure process, a block dissolution process, and a block explosion process, it will be appreciated that other conditions or operations may be set in the game process, and further types of arrangement settling process may alternatively be performed.

Figure 16:
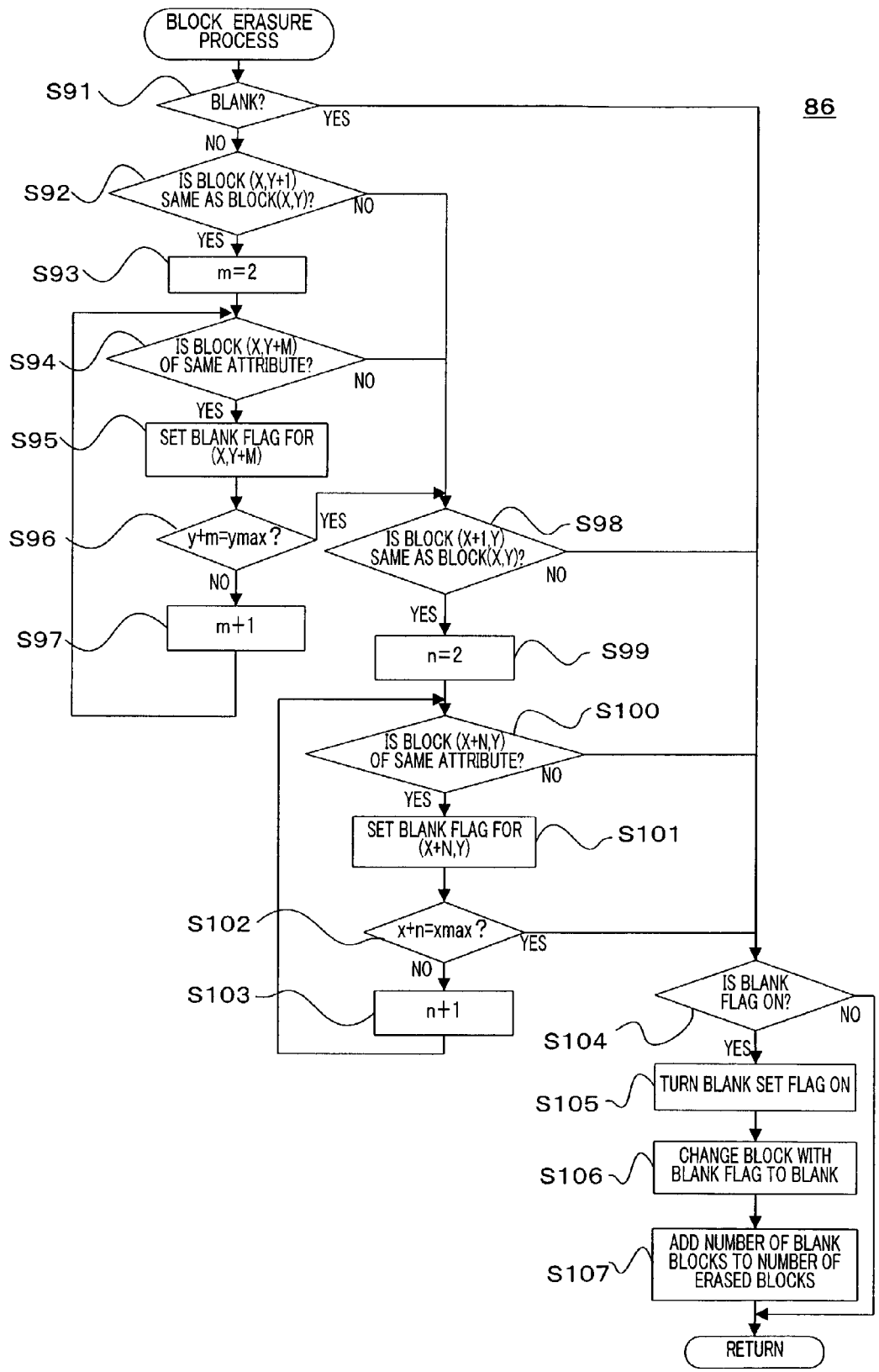
FIG. 16 is a flowchart of image transformation processing involving an erasure of puzzle elements in the puzzle game according to the present non-limiting exemplary embodiment.

Now, the block erasure process of step S86 will be described in detail with reference to FIG. 16. First, it is determined at step S91 whether the block of interest is a blank block or not. If not, control proceeds to step S92 to determine whether the block of interest and a block adjoining the block in the y direction are of the same attribute (e.g., being erasable blocks in this example) or not. If they are of the same attribute, it is further determined whether or not a next adjoining block in the y direction is also of the same attribute; specifically, an initial value of m to be used in an ensuing loop process is set at m=2 at step S93, and step S94 is performed to determine the identicalness in attribute. If the block is found to be also of the same attribute, at step S95, a blank flag 88 is set for the block. Until reaching the maximum value ymax−1 (step S96), the m value is incremented (step S97) to further determine the block attributes in the y direction. Thus, blank flags are consecutively assigned to blocks of the same attribute.

If it is determined at step S92 or step S94 that an adjoining block in the y direction is not of the same attribute and it is determined at step S96 that the adjoining blocks have been checked up to ymax, then it is determined at step S98 whether a block adjoining the block of interest in the x direction is of the same attribute or not. If it is of the same attribute, it is further determined whether or not a next adjoining block in the x direction is also of the same attribute; specifically, an initial value of n to be used in an ensuing loop process is set at n=2 at step S99, and step S100 is performed to determine the identicalness in attribute. If the block is found to be also of the same attribute, at step S101, a blank flag 88 is set for the block. Until reaching the maximum value xmax (step S102), the n value is incremented (step S103) to further determine the block attributes in the x direction. Thus, blank flags are consecutively assigned to blocks of the same attribute.

If the first block of interest is determined at step S91 to be a blank block, if it is determined at step S98 that the adjoining block in the x direction is not of the same attribute, or if it is determined at step S102 that the adjoining blocks have been checked up to xmax, control proceeds to step S104. If it is determined at step S104 that blank flags 88 have been set for any blocks, a blank set flag is turned ON at step S105. Then, the blocks for which blank flags have been set are converted into blank blocks (step S106), i.e., the blocks are erased. Since the present example assumes that the erasure of a certain number of blocks is a condition for game clearance, the number of blank blocks at step S107 is added into the erased blocks, and the block erasure process is ended.

While the non-limiting exemplary embodiments have been described in detail, the foregoing description is in all aspects illustrative and not restrictive. It is understood that numerous other modifications and variations can be devised without departing from the scope of the invention.

What is claimed is:

1. A game system for allowing a puzzle game to be played thereon, the game system comprising:
    a display screen for displaying a plurality of puzzle elements of the puzzle game, the plurality of puzzle elements being operable within the display screen;
    a tilt detection section for detecting a tilt;
    a puzzle element displaying control section for at least controlling at least one of the plurality of puzzle elements displayed on the display screen to be moved in response to an output from the tilt detection section; and
    an image transformation section for causing an image transformation when a plurality of puzzle elements take a predetermined arrangement as a result of the control by the puzzle element displaying control section, wherein
    the puzzle element displaying control section includes:
        an initial image generation section for generating an initial image to be displayed before the at least one puzzle element is moved, and
        a puzzle element addition section for causing a plurality of puzzle elements to be additionally displayed on the display screen from a plurality of different directions respectively corresponding to a plurality of different tilt directions of the tilt detected in the tilt detection section.

2. The game system according to claim 1, further comprising a game controller or a game pad,
    wherein the puzzle element addition section causes the puzzle elements to be additionally displayed on the display screen upon detection of an output from the game controller or game pad.

3. The game system according to claim 1, further comprising a timer,
    wherein the puzzle element addition section causes the puzzle elements to be additionally displayed on the display screen in response to an output from the timer having measured a predetermined period of time.

4. The game system according to claim 1,
    wherein the puzzle element displaying control section comprises an attribute data setting section for assigning an attribute to each of the plurality of puzzle elements.

5. The game system according to claim 4,
    wherein the image transformation section causes the image transformation with respect to an arrangement of puzzle elements having a same attribute assigned by the attribute data setting section.

6. The game system according to claim 5,
    wherein the image transformation section causes the image transformation when a predetermined number or more of contiguous puzzle elements having the same attribute assigned by the attribute data setting section are aligned in at least one direction.

7. The game system according to claim 5,
    wherein the image transformation section causes the image transformation when at least two puzzle elements having the same attribute assigned by the attribute data setting section take an arrangement interposing a predetermined number of puzzle elements.

8. The game system according to claim 5,
    wherein the image transformation section causes the image transformation when a plurality of puzzle elements having the same attribute assigned by the attribute data setting section take a predetermined arrangement, the image transformation involving erasing all of the plurality of puzzle elements taking the predetermined arrangement.

9. The game system according to claim 5,
    wherein the image transformation section causes the image transformation when a plurality of puzzle elements having the same attribute assigned by the attribute data setting section take a predetermined arrangement, the image transformation comprising combining all of the plurality of puzzle elements taking the predetermined arrangement.

10. The game system according to claim 5,
    wherein, when a plurality of puzzle elements having the same attribute assigned by the attribute data setting section take a predetermined arrangement, the image transformation section changes the attribute of the plurality of puzzle elements taking the predetermined arrangement.

11. The game system according to claim 4, further comprising a game controller or a game pad,
    wherein, after at least one puzzle element having assigned thereto an attribute which is associated with a particular operational output from the controller or game pad takes a predetermined arrangement with at least another puzzle element, the image transformation section causes the image transformation upon detecting the particular operational output.

12. The game system according to claim 4, further comprising a game controller or a game pad,
    wherein, after at least one puzzle element having assigned thereto an attribute which is associated with a particular operational output from the controller or game pad is arranged so as to adjoin at least another puzzle element, the image transformation section causes the image transformation upon detecting the particular operational output, the image transformation involving erasing the at least one puzzle element and the at least other puzzle element.

13. The game system according to claim 4, further comprising a game controller or a game pad,
wherein the attribute data setting section assigns an attribute concerning a moving direction to each of the plurality of puzzle elements, and
the puzzle element displaying control section controls each of the plurality of puzzle elements displayed on the display screen to be moved in accordance with the attribute concerning the moving direction.

14. The game system of claim 1, wherein the puzzle element displaying control section moves all of the plurality of puzzle elements displayed on the display screen in one direction within the display screen in response to an output from the tilt detection section.

15. The game system of claim 1, wherein the puzzle element displaying control section moves the at least one of the plurality of puzzle elements displayed within the display screen in response to the output form the tilt detection section only when a neighboring space of the at least one of the plurality of puzzle elements defines a vacancy within the display screen.

16. A computer readable medium storing a puzzle game program for causing a game system to function as a puzzle game, the game system at least comprising an image display section for displaying a plurality of puzzle elements of the puzzle game, a tilt detection section for detecting a tilt of the game system, and a puzzle element storage section, the plurality of puzzle elements being operable on within a display screen of the image display section, the program comprising:
a tilt direction determination step of determining a plurality of different tilt directions in accordance with an output from the tilt detection section;
a puzzle element movement displaying control step of controlling at least one of the plurality of puzzle elements displayed on the display screen to be moved in accordance with the tilt direction determination step; and
an image transformation step of causing an image transformation when a plurality of puzzle elements displayed on the display screen take a predetermined arrangement after performing the puzzle element movement displaying control step, wherein
the puzzle element movement displaying control step includes:
an initial image generation step for generating an initial image to be displayed before the at least one puzzle element is moved, and
a puzzle element addition step for causing a plurality of puzzle elements to be additionally displayed on the display screen from a plurality of different directions respectively corresponding to the plurality of different tilt directions of the tilt detected in the tilt detection section.

17. The computer readable medium according to claim 16, wherein the puzzle game program causes the game system to repeatedly perform the tilt direction determination step, the puzzle element movement displaying step, and the image transformation step.

18. The computer readable medium according to claim 16,
wherein the game system comprises a game controller or a game pad, and
the puzzle element addition step is performed in response to an output from the game controller or game pad.

19. The computer readable medium according to claim 16,
wherein the game system comprises a timer,
wherein the puzzle element addition step is performed in response to an output from the timer having measured a predetermined period of time.

20. The computer readable medium according to claim 16,
wherein the puzzle element storage section stores attribute data for each of the plurality of puzzle elements, and
the image transformation step causes the image transformation with respect to an arrangement of puzzle elements having same attribute data.

21. The computer readable medium according to claim 20,
wherein the image transformation step causes the image transformation when a predetermined number or more of contiguous puzzle elements having the same attribute data stored in the puzzle element storage section are aligned in at least one direction.

22. The computer readable medium according to claim 21,
wherein the image transformation step causes the image transformation when a plurality of puzzle elements having the same attribute take a predetermined arrangement, the image transformation involving erasing the plurality of puzzle elements taking the predetermined arrangement.

23. The computer readable medium according to claim 16, wherein the storage medium comprises the tilt detection section integrally formed therein.

24. The computer readable medium of claim 16, wherein the puzzle element movement displaying control step comprises moving all of the plurality of puzzle elements displayed on the display screen in one direction within the display screen in accordance with a tilt direction determined in the tilt detection determination step.

25. The computer readable medium of claim 16, wherein the puzzle element movement displaying control step comprises moving the at least one of the plurality of puzzle elements displayed within the display screen in accordance with the tilt direction determined in the tilt detection step only when a neighboring space of the at least one of the plurality of puzzle elements defines a vacancy within the display screen.

26. A game system for allowing a puzzle game to be played thereon, the game system comprising:
a display section for displaying a plurality of puzzle elements of the puzzle game, the plurality of puzzle elements being operable on within a display screen of the display section;
an acceleration detection section for detecting an acceleration;
a puzzle element displaying control section for controlling at least one of the plurality of puzzle elements displayed on the display screen to be moved in response to an output from the acceleration detection section; and
an image transformation section for causing an image transformation when a plurality of puzzle elements take a predetermined arrangement as a result of the control by the puzzle element displaying control section, wherein the puzzle element displaying control section includes:
an initial image generation section for generating an initial image to be displayed before the at least one puzzle element is moved, and
a puzzle element addition section for causing a plurality of puzzle elements to be additionally displayed on the display screen from a plurality of different directions respectively corresponding to a plurality of different acceleration directions of the acceleration detected in the acceleration detection section.

27. The game system according to claim 26, wherein the puzzle element displaying control section comprises a puzzle element addition section for causing puzzle elements to be additionally displayed on the display screen in response to an output from the acceleration detection section.

28. The game system of claim 26, wherein the puzzle element displaying control section moves all of the plurality of puzzle elements displayed on the display screen in one direction within the display screen in response to an output from the acceleration detection section.

29. The game system of claim 26, wherein the puzzle element displaying control section moves the at least one of the plurality of puzzle elements displayed within the display screen in response to the output form the acceleration detection section only when a neighboring space of the at least one of the plurality of puzzle elements defines a vacancy within the display screen.

30. A computer readable medium storing a puzzle game program for use in a game system, the game system at least comprising: a tilt detection section for detecting a tilt; a puzzle element data storage section for storing at least attribute data concerning puzzle elements to be displayed on the display screen; a display section for displaying the puzzle elements on a display screen; and a processing section for processing the puzzle game program and changing displayed state of at least one puzzle element displayed on the display screen in accordance with a tilt direction detected by the tilt detection section and puzzle element data stored in the puzzle element data storage section, wherein the puzzle game program causes the game system to function as a puzzle game such that, with respect to a plurality of puzzle elements displayed on the display screen each having at least one predetermined shape and one of at least two attributes, when a plurality of puzzle elements having a same attribute take an arrangement having a predetermined regularity, the plurality of puzzle elements taking the predetermined arrangement are converted to puzzle elements of another attribute and displayed, and puzzle elements are displayed at some coordinate positions in the display screen and vacancies are displayed at other coordinate positions, the puzzle elements being piled up from a lower position to a higher position in accordance with the tilt direction detected by the tilt detection section, the puzzle game program comprising:
a tilt direction determination step of determining a plurality of different tilt directions based on an output from the tilt detection section when a whole or a part of the game system is tilted;
a puzzle element movement displaying control step of controlling the puzzle elements displayed on the display screen to be moved in the tilt direction while allowing the puzzle elements to be piled up on an end of the display screen in the tilt direction to build in an opposite direction of the tilt direction;
a displayed state determination step of determining whether displayed states of the puzzle elements displayed on the display screen have taken an arrangement having a predetermined regularity or not; and
a displayed state changing step of, in accordance with a result of determination by the displayed state determination step, converting a plurality of puzzle elements of the same attribute having taken the predetermined arrangement into puzzle elements having another attribute, wherein the puzzle element movement displaying control step includes:
an initial image generation step for generating an initial image to be displayed before the at least one puzzle element is moved, and
a puzzle element addition step for causing a plurality of puzzle elements to be additionally displayed on the display screen from a plurality of different directions respectively corresponding to the plurality of different tilt directions of the tilt detected in the tilt detection section.

31. The computer readable medium according to claim 30,
wherein the displayed state determination step determines that the plurality of puzzle elements have taken the predetermined arrangement when puzzle elements of the same attribute are arranged with a predetermined pattern on the display screen.

32. The computer readable medium according to claim 31,
wherein the displayed state determination step determines that the plurality of puzzle elements have taken the predetermined arrangement when a predetermined number or more of contiguous puzzle elements having the same attribute data are aligned in at least one direction on the display screen.

33. The computer readable medium of claim 30, wherein the puzzle element movement displaying control step comprises moving all of the plurality of puzzle elements displayed on the display screen in one direction within the display screen in accordance with a tilt direction determined in the tilt detection determination step.

34. The computer readable medium of claim 30, wherein the puzzle element movement displaying control step comprises moving the at least one of the plurality of puzzle elements displayed within the display screen in accordance with the tilt direction determined in the tilt detection step only when a neighboring space of the at least one of the plurality of puzzle elements defines a vacancy within the display screen.

35. In a videogame system, a method of controlling puzzle elements displayed in a game image screen of a puzzle videogame, the method comprising:
detecting a first tilt of a hand-held control device in a particular direction;
adding new puzzle elements for display in the game image screen on a first side of the game image screen based on the direction of the first tilt;
moving the puzzle elements displayed in the game image screen based on the direction of the first tilt;
detecting a second tilt of the hand-held control device in a particular direction which is different than the direction of the first tilt;

adding new puzzle elements for display in the game image screen on a second side of the game image screen based on the direction of the second tilt, the second side of the game image screen being different than the first side of the game image screen; and moving the puzzle elements displayed in the game image screen based on the direction of the second tilt.

36. The method of claim 35, further comprising:

detecting a third tilt of the hand-held control device in a particular direction which is different than the direction of the first tilt and the direction of the second tilt;

adding new puzzle elements for display in the game image screen on a third side of the game image screen based on the direction of the third tilt, the third side of the game image screen being different than the first and second sides of the game image screen; and moving the puzzle elements displayed in the game image screen based on the direction of the third tilt.

37. The method of claim 36, further comprising:

detecting a fourth tilt of the hand-held control device in a particular direction which is different than the respective directions of the first, second and third tilts;

adding new puzzle elements for display in the game image screen on a fourth side of the game image screen based on the direction of the fourth tilt, the fourth side of the game image screen being different than the first, second and third sides of the game image screen; and moving the puzzle elements displayed in the game image screen based on the direction of the fourth tilt.

38. In a videogame system, a method of controlling puzzle elements displayed in a four-sided game image screen of a puzzle videogame, the method comprising:

detecting tilt of a hand-held control device in a plurality of different directions;

moving the puzzle elements displayed in the game image screen in a plurality of different directions based on respective directions of the detected tilt; and adding new puzzle elements for display in the game image screen on one side of the game image screen based on a respective one of the different directions of detected tilt;

wherein the new puzzle elements may be added into the game screen on each of the four sides of the game image screen.

* * * * *